US012785401B2

(12) United States Patent
Zhao et al.

(10) Patent No.: US 12,785,401 B2
(45) Date of Patent: Nov. 3, 2026

(54) DIRECT CURRENT BUS VOLTAGE CONTROL METHOD AND APPARATUS, AND POWER SYSTEM

(71) Applicant: HUAWEI TECHNOLOGIES CO., LTD., Shenzhen (CN)

(72) Inventors: Mingquan Zhao, Shanghai (CN); Zhangping Shao, Shanghai (CN); Haibin Guo, Dongguan (CN)

(73) Assignee: Huawei Technologies Co., LTD., Shenzhen (CN)

( * ) Notice: Subject to any disclaimer, the term of this patent is extended or adjusted under 35 U.S.C. 154(b) by 960 days.

(21) Appl. No.: 18/156,672

(22) Filed: Jan. 19, 2023

(65) Prior Publication Data

US 2023/0155386 A1 May 18, 2023

Related U.S. Application Data

(63) Continuation of application No. PCT/CN2021/083085, filed on Mar. 25, 2021.

(30) Foreign Application Priority Data

Jul. 21, 2020 (CN) ........................ 202010706718.8

(51) Int. Cl.
*H02J 3/36* (2026.01)
*H02J 3/12* (2006.01)
*H02M 1/00* (2006.01)

(52) U.S. Cl.
CPC .................................... *H02J 3/36* (2013.01); *H02J 3/12* (2013.01); *H02M 1/0016* (2021.05); *H02M 1/0025* (2021.05)

(58) Field of Classification Search
CPC ...... H02J 3/36; H02J 3/12; H02J 3/381; H02J 2101/25; H02J 2101/28; H02J 2103/30;
(Continued)

(56) References Cited

U.S. PATENT DOCUMENTS

| | | | | |
|---|---|---|---|---|
| 2012/0087165 A1* | 4/2012 | Esram | ................ | H02M 7/4807 363/97 |
| 2017/0104333 A1* | 4/2017 | Premerlani | ............ | H02J 3/381 |

(Continued)

FOREIGN PATENT DOCUMENTS

| | | |
|---|---|---|
| CN | 106410854 A | 2/2017 |
| CN | 106655913 A | 5/2017 |
| CN | 107994614 A | 5/2018 |

OTHER PUBLICATIONS

GB/T 37408-2019, "Technical requirements for photovoltaic grid connected inverters," Dec. 2019, 89 pages (with English translation).

(Continued)

*Primary Examiner* — Monica Lewis
*Assistant Examiner* — Jye-June Lee
(74) *Attorney, Agent, or Firm* — Fish & Richardson P.C.

(57) ABSTRACT

Embodiments of this application provide direct current bus voltage control methods and apparatuses. In an implementation, a method includes: obtaining an electrical parameter between the conversion circuit and the direct current bus, generating a predicted voltage between the inverter circuit and the alternating current grid based on the electrical parameter and a voltage prediction model, and controlling a voltage between the conversion circuit and the direct current bus based on the predicted voltage.

18 Claims, 10 Drawing Sheets

(58) Field of Classification Search
CPC ............. H02M 1/0003; H02M 1/4225; H02M 1/0012; H02M 1/0016; H02M 1/0019; H02M 1/0022; H02M 1/0025; H02M 1/007; H02M 1/325; H02M 3/1566; H02M 3/157; H02M 3/1582; H02M 3/33507; H02M 3/156; H02M 7/5387; H02M 7/53871
See application file for complete search history.

(56) References Cited

U.S. PATENT DOCUMENTS

| | | | | |
|---|---|---|---|---|
| 2017/0244325 | A1* | 8/2017 | Carralero | H02M 3/33546 |
| 2019/0219029 | A1* | 7/2019 | Biris | H02M 1/32 |
| 2019/0296551 | A1* | 9/2019 | Kawachi | H02J 3/18 |

OTHER PUBLICATIONS

Yaramasu et al., "Fixed Switching Frequency Predictive Control of Boost Converter Interfaced PMSG Wind Turbines," Proceedings of 2020 International Conference on Power Electronics & IoT Applications in Renewable Energy and its Control (PARC), Feb. 28, 2020, pp. 518-523.
Sajadian et al., "Distributed Maximum Power Point Tracking Using Model Predictive Control for Photovoltaic Energy Harvesting Architectures Based on Cascaded Power Optimizers," IEEE Journal Of Photovoltaics, vol. 7, No. 3, May 1, 2017, pp. 849-857.
International Search Report and Written Opinion in International Appln. No. PCT/CN2021/083085, mailed on Jun. 23, 2021, 15 pages (with English translation).
Extended European Search Report in European Appln. No. 21846049.1, mailed on Nov. 24, 2023, 8 pages.

* cited by examiner

DIRECT CURRENT BUS VOLTAGE CONTROL METHOD AND APPARATUS, AND POWER SYSTEM

CROSS-REFERENCE TO RELATED APPLICATIONS

This application is a continuation of International Patent Application No. PCT/CN2021/083085, filed on Mar. 25, 2021, which claims priority to Chinese Patent Application No. 202010706718.8, filed on Jul. 21, 2020. The disclosures of the aforementioned applications are hereby incorporated by reference in their entireties.

TECHNICAL FIELD

This application relates to the field of electric power technologies, and in particular, to a direct current bus voltage control method and apparatus, and a power system.

BACKGROUND

At present, renewable energy generating equipment has a good development prospect due to its advantages in environmental protection. However, high-proportion renewable energy generating equipment represented by photovoltaic/wind power is controlled by a power electronic device and connected to a grid. For example, the generating equipment is connected to an alternating current grid by successively using a conversion circuit, a direct current bus, and an inverter circuit. Characteristics of renewable energy generating equipment are quite different from those of synchronous generators in traditional power systems, which poses a great challenge to safe and stable operation of modern power systems. All countries in the world have adopted grid connection requirements to regulate grid connection behavior of the renewable energy generating equipment, especially when transient conditions such as fault ride through occur.

A high voltage ride through power grid fault is used as an example, and a voltage of the alternating current grid rises suddenly during high voltage ride through. In this case, an inverter circuit that is not disconnected during high voltage ride through is usually required to output the same active power as active power output before the fault, and an allowable error should not exceed 10% PN (rated power). This puts forward a power controllable requirement on the inverter circuit during a power grid fault.

During high voltage ride through, because a voltage on the alternating current grid side rapidly increases, a voltage on the direct current bus increases synchronously due to a limitation of a control loop of the inverter circuit on a pulse width modulation (PWM) modulation ratio. In this case, at an initial stage of the fault process, the conversion circuit (for example, a boost circuit) has not received information about a fault on a power grid side (for example, a voltage between the alternating current grid and the inverter circuit), and control of a power system is in a maximum power point tracking (MPPT) normal operating state. Before the conversion circuit receives information about the fault on the power grid side and completes a voltage control process of the direct current bus based on the information about the fault on the power grid side, a voltage of the direct current bus on the conversion circuit side cannot keep up with an increase of a voltage of the direct current bus on the inverter circuit side, which usually results in a case in which power on a direct current side cannot be smoothly sent out and power is uncontrollable. In particular, for a distributed inverter, an inverter circuit and a conversion circuit included therein are connected by using a long-distance (usually exceeding 1 KM) direct current bus. After a voltage of an alternating current grid is detected, it is transmitted to the conversion circuit, and there is a significant delay in implementing control on the conversion circuit. In summary, the inverter circuit cannot transmit power in this case. On one hand, the alternating current grid faces unbalanced active power during high voltage ride through. Because power output to the alternating current grid decreases, the alternating current grid needs to increase frequency to maintain the active power, which will affect frequency stability of the alternating current grid. On the other hand, due to a sudden decrease in the active power, the voltage of the alternating current grid will be raised further, which is not conducive to maintaining a grid connection by the inverter circuit. With a continuous increase of a power generation and grid connection capacity of renewable energy, its impact on stability of the alternating current grid becomes extremely important.

SUMMARY

Embodiments of this application provide a direct current bus voltage control method and apparatus, and a power system, to quickly identify a voltage between an inverter circuit and an alternating current grid, so as to timely control a voltage of a direct current bus, to improve stability of a power grid.

To achieve the foregoing objective, the following technical solutions are used in this application.

According to a first aspect, a direct current bus voltage control method is provided. The method is applied to a power system, where the power system includes a conversion circuit, a direct current bus, and an inverter circuit, and the direct current bus is connected to the conversion circuit and the inverter circuit. The conversion circuit is connected to a direct current source, and the inverter circuit is connected to an alternating current grid. The direct current bus voltage control method includes: obtaining an electrical parameter between the conversion circuit and the direct current bus; generating a predicted voltage between the inverter circuit and the alternating current grid based on the electrical parameter and a voltage prediction model; and controlling a voltage between the conversion circuit and the direct current bus based on the predicted voltage. The electrical parameter in this embodiment of this application may be one or more of electrical parameters such as a voltage, a current, power, and a harmonic parameter. The power and the harmonic parameter may be generated by sampling and processing the voltage and the current. For example, the voltage prediction model is a model generated based on an equivalent circuit of the direct current bus, or the voltage prediction model is a model generated based on equivalent circuits of the direct current bus and the inverter circuit.

In the foregoing solution, after obtaining the electrical parameter between the conversion circuit and the direct current bus, a direct current bus voltage control apparatus can directly generate the predicted voltage between the inverter circuit and the alternating current grid based on the electrical parameter and the voltage prediction model; then, control the voltage between the conversion circuit and the direct current bus based on the predicted voltage; and can avoid a delay caused by obtaining the voltage between the conversion circuit and the direct current bus when the inverter circuit and the conversion circuit are connected by using a long-distance direct current bus, and can quickly identify a voltage between the inverter circuit and the alternating current grid, so as to implement timely control on a voltage of the direct current bus, thereby improving stability of a power grid.

In a possible implementation, for example, the voltage prediction model is a model generated based on equivalent circuits of the direct current bus and the inverter circuit, depending on a difference of the voltage prediction model. The generating a predicted voltage between the inverter circuit and the alternating current grid based on the electrical parameter and a voltage prediction model includes: inputting the electrical parameter into the voltage prediction model to generate the predicted voltage between the inverter circuit and the alternating current grid. That is, the voltage between the inverter circuit and the alternating current grid is directly predicted. A relationship between the electrical parameter between the conversion circuit and the direct current bus and the voltage between the inverter circuit and the alternating current grid is mainly related to inductive reactance of an inductor and capacitive reactance of a capacitor in the equivalent circuit. Therefore, the voltage prediction model may be obtained through training by using the voltage between the conversion circuit and the direct current bus as input to a learning network, and the voltage between the inverter circuit and the alternating current grid as output of the learning network. For example, a voltage between the conversion circuit and the direct current bus may be sampled at different moments, and a voltage between the conversion circuit and the direct current bus corresponding to the voltage between the conversion circuit and the direct current bus is sampled to form a mapping relationship, and then the mapping relationship is trained by using the learning network to generate the voltage prediction model. In this way, for the obtained voltage prediction model, when a voltage between the conversion circuit and the direct current bus is input to the voltage prediction model, a voltage between the conversion circuit and the direct current bus is output.

In a possible implementation, for example, the voltage prediction model is a model generated based on equivalent circuits of the direct current bus and the inverter circuit, depending on a difference of the voltage prediction model. The generating a predicted voltage between the inverter circuit and the alternating current grid based on the electrical parameter between the conversion circuit and the direct current bus and the voltage prediction model includes: generating a second voltage variation between the inverter circuit and the alternating current grid based on the electrical parameter between the conversion circuit and the direct current bus and the voltage prediction model, where the voltage prediction model is a model generated based on the equivalent circuits of the direct current bus and the inverter circuit; and generating the predicted voltage between the alternating current grid and the inverter circuit based on the second voltage variation. That is, a voltage variation between the alternating current grid and the inverter circuit is predicted, and then the predicted voltage between the alternating current grid and the inverter circuit is generated based on the voltage variation between the alternating current grid and the inverter circuit. The relationship between the electrical parameter between the conversion circuit and the direct current bus and the voltage between the inverter circuit and the alternating current grid is mainly related to inductive reactance of an inductor and capacitive reactance of a capacitor in the equivalent circuit. Therefore, the voltage prediction model may be obtained through training by using voltages between any two conversion circuits and the direct current bus as input to the learning network, and the second voltage variation between the inverter circuit and the alternating current grid as output of the learning network. When the second voltage variation corresponds to a voltage between the conversion circuit and the direct current bus at a first moment t1 and a voltage between the conversion circuit and the direct current bus at a second moment t2, the voltage between the inverter circuit and the alternating current grid varies. Then, the second voltage variation is added to a normal voltage between the inverter circuit and the alternating current grid to obtain the predicted voltage, where the normal voltage may be a power grid voltage in a steady state, and the normal voltage may be a default value or a pre-measured value, for example, may be a voltage between the inverter circuit and the alternating current grid detected by a detection device in a steady state, and the normal voltage may be a voltage detected at any moment before a predetermined time period [t1, t2]. In addition, the electrical parameter between the conversion circuit and the direct current bus may also be a variation value of a voltage, for example, variation values of the voltage between the conversion circuit and the direct current bus at the first moment t1 and the voltage between the conversion circuit and the direct current bus at the second moment t2. In this way, the voltage prediction model may be obtained through training by using a voltage variation value between the conversion circuit and the direct current bus as input to the learning network, and the second voltage variation between the inverter circuit and the alternating current grid as output of the learning network.

In a possible implementation, for example, the voltage prediction model is a model generated based on an equivalent circuit of the direct current bus, depending on a difference of the voltage prediction model; and the generating a predicted voltage between the inverter circuit and the alternating current grid based on the electrical parameter between the conversion circuit and the direct current bus and the voltage prediction model includes: generating a voltage between the inverter circuit and the direct current bus based on the electrical parameter between the conversion circuit and the direct current bus and the voltage prediction model; and generating the predicted voltage between the alternating current grid and the inverter circuit based on the voltage between the inverter circuit and the direct current bus. Because the relationship between the electrical parameter between the conversion circuit and the direct current bus and the voltage between the direct current bus and the inverter circuit is mainly related to inductive reactance of an inductor and capacitive reactance of a capacitor in the direct current bus of the equivalent circuit, the voltage prediction model is a model generated based on the equivalent circuit of the direct current bus. For example, the voltage prediction model may be obtained through training by using the voltage between the inverter circuit and the direct current bus as input to the learning network, and the voltage between the direct current bus and the inverter circuit as output of the learning network. For example, a voltage between the inverter circuit and the direct current bus may be sampled at different moments, a corresponding voltage between the direct current bus and the inverter circuit is sampled to form a mapping relationship, and then the mapping relationship is trained by using the learning network to generate the voltage prediction model. In this case, when a sampled voltage between the conversion circuit and the direct current bus is input to the voltage prediction model, a voltage between the direct current bus and the inverter circuit may be obtained. Because an electrical characteristic of the inverter circuit is fixed, a voltage ratio on two sides of the inverter circuit is mainly related to a modulation ratio of a control signal. Therefore, a voltage between the direct current bus and the inverter circuit may be directly converted into a voltage between the inverter circuit and the alternating current grid based on a modulation ratio of the inverter circuit. Generally, the modulation ratio of the inverter circuit is defined as a peak of a phase voltage between the direct current bus and the inverter circuit/a half of the voltage between the inverter circuit and the alternating current grid. The modulation ratio is generally fixed in a control process. Even in a transient state of a voltage surge fault of the alternating current grid, control logic of the inverter circuit remains unchanged, and usually a value is around 1.14 (maximum physical limit is 1.15).

In a possible implementation, for example, the voltage prediction model is a model generated based on an equivalent circuit of the direct current bus, depending on a difference of the voltage prediction model; and the generating a predicted voltage between the inverter circuit and the alternating current grid based on the electrical parameter between the conversion circuit and the direct current bus and the voltage prediction model includes: generating a first voltage variation between the inverter circuit and the direct current bus based on the electrical parameter between the conversion circuit and the direct current bus and the voltage prediction model, where the voltage prediction model is a model generated based on the equivalent circuit of the direct current bus; and generating the predicted voltage between the alternating current grid and the inverter circuit based on the first voltage variation. The relationship between the electrical parameter between the conversion circuit and the direct current bus and the first voltage variation between the inverter circuit and the direct current bus is mainly related to inductive reactance of an inductor and capacitive reactance of a capacitor in the equivalent circuit of the direct current bus. Therefore, the voltage prediction model may be obtained through training by using voltages between any two conversion circuits and the direct current bus as input to the learning network, and the first voltage variation between the inverter circuit and the direct current bus as output of the learning network. When the first voltage variation corresponds to a voltage Ub1 between the conversion circuit and the direct current bus at a first moment t1 and a voltage Ub2 between the conversion circuit and the direct current bus at a second moment t2, the voltage between the inverter circuit and the direct current bus varies. Then, the electrical characteristic of the inverter circuit is fixed, and the voltage ratio on two sides of the inverter circuit is mainly related to the modulation ratio of the control signal. Therefore, the voltage between the inverter circuit and the direct current bus may be directly converted into a voltage between the alternating current grid and the inverter circuit based on the modulation ratio of the inverter circuit. Therefore, a third voltage variation between the inverter circuit and the alternating current grid is generated based on the first voltage variation and the electrical characteristic of the inverter circuit. A predicted voltage is generated based on the third voltage variation and a pre-stored normal voltage value between the inverter circuit and the alternating current grid. For example, the first voltage variation may be converted into the third voltage variation between the inverter circuit and the alternating current grid based on the first voltage variation and the electrical characteristic of the inverter circuit. The third voltage variation is added to the normal voltage between the inverter circuit and the alternating current grid to obtain the predicted voltage, where the normal voltage may be a power grid voltage in a steady state, the normal voltage may be the voltage between the inverter circuit and the alternating current grid detected by a detection device in a steady state, and for example, the normal voltage may be a voltage detected at any moment before a predetermined time period. In addition, the electrical parameter between the conversion circuit and the direct current bus may also be a variation value of a voltage, for example, variation values of the voltage between the conversion circuit and the direct current bus at the first moment t1 and the voltage between the conversion circuit and the direct current bus at the second moment t2. In this way, the voltage prediction model may be obtained through training by using a variation value between the conversion circuit and the direct current bus as input to the learning network, and the first voltage variation between the inverter circuit and the direct current bus as output of the learning network.

In a possible implementation, the controlling a voltage between the conversion circuit and the direct current bus based on the predicted voltage includes: when it is determined that the predicted voltage is greater than a voltage threshold, converting the predicted voltage into a voltage reference value between the conversion circuit and the direct current bus; generating a second current reference value based on the voltage reference value and a first voltage measurement value between the conversion circuit and the direct current bus; and adjusting the voltage between the conversion circuit and the direct current bus based on the second current reference value.

In a possible implementation, the converting the predicted voltage into a voltage reference value between the conversion circuit and the direct current bus includes: converting the predicted voltage into the voltage reference value between the conversion circuit and the direct current bus based on the direct current bus and the electrical characteristic of the inverter circuit.

In a possible implementation, the controlling a voltage between the conversion circuit and the direct current bus based on the predicted voltage includes: when it is determined that the predicted voltage is less than or equal to a voltage threshold, determining a maximum power point of the direct current source based on a current measurement value between the direct current source and the conversion circuit, and generating a first current reference value corresponding to the maximum power point; and adjusting the voltage between the conversion circuit and the direct current bus based on the first current reference value.

In a possible implementation, the controlling a voltage between the conversion circuit and the direct current bus based on the predicted voltage includes: converting the predicted voltage into a voltage reference value between the conversion circuit and the direct current bus; generating a second current reference value based on the voltage reference value and a first voltage measurement value between the conversion circuit and the direct current bus; determining a maximum power point of the direct current source based on a current measurement value between the direct current source and the conversion circuit, and generating a first current reference value corresponding to the maximum power point; and when it is determined that the first current reference value is greater than the second current reference value, adjusting the voltage between the conversion circuit and the direct current bus based on the second current reference value; or when it is determined that the first current reference value is less than or equal to the second current reference value, adjusting the voltage between the conversion circuit and the direct current bus based on the first current reference value.

In a possible implementation, before the generating a predicted voltage between the inverter circuit and the alternating current grid based on the electrical parameter and a voltage prediction model, the method further includes: generating, based on equivalent circuits of the direct current bus and the inverter circuit, the voltage prediction model through training by using an electrical parameter between the conversion circuit and the direct current bus as an input parameter of a learning network, and a voltage between the inverter circuit and the alternating current grid as an output parameter of the learning network.

In a possible implementation, before the generating a first voltage variation between the inverter circuit and the direct current bus based on the electrical parameter and a voltage prediction model, the method further includes: based on an equivalent circuit of the direct current bus, generating the voltage prediction model through training by using an electrical parameter between the conversion circuit and the direct current bus as an input parameter of a learning network, and a voltage variation between the inverter circuit and the direct current bus as an output parameter of the learning network.

In a possible implementation, before the generating a second voltage variation between the inverter circuit and the alternating current grid based on the electrical parameter and a voltage prediction model, the method further includes: generating, based on equivalent circuits of the direct current bus and the inverter circuit, the voltage prediction model through training by using an electrical parameter between the conversion circuit and the direct current bus as an input parameter of a learning network, and a voltage variation between the inverter circuit and the alternating current grid as an output parameter of the learning network.

According to a second aspect, a direct current bus voltage control apparatus is provided to implement the foregoing methods. A quality factor detection apparatus based on an oscillation circuit includes corresponding modules, units, or means (means) for implementing the foregoing methods. The module, unit, or means may be implemented by using hardware or software, or may be implemented through hardware executing corresponding software. The hardware or the software includes one or more modules or units corresponding to the foregoing functions.

According to a third aspect, a direct current bus voltage control apparatus is provided, which is applied to a power system, where the power system includes a conversion circuit, a direct current bus and an inverter circuit, and the direct current bus is connected to the conversion circuit and the inverter circuit. The conversion circuit is connected to a direct current source, and the inverter circuit is connected to an alternating current grid. The direct current bus voltage control apparatus includes a processor and a memory. The memory is configured to store computer instructions, and when the processor executes the instructions, the direct current bus voltage control apparatus performs the method in any one of the foregoing aspects.

According to a fourth aspect, a direct current bus voltage control apparatus is provided, which is applied to a power system, where the power system includes a conversion circuit, a direct current bus, and an inverter circuit, and the direct current bus is connected to the conversion circuit and the inverter circuit. The conversion circuit is connected to a direct current source, and the inverter circuit is connected to an alternating current grid. The direct current bus voltage control apparatus includes a processor and a transmission interface. The processor is configured to invoke program instructions stored in a memory to perform the method in any one of the foregoing aspects.

In a possible implementation, the direct current bus voltage control apparatus further includes a memory, and the memory is configured to store necessary program instructions and data. When the direct current bus voltage control apparatus is a chip system, the direct current bus voltage control apparatus may be composed of chips, or may include a chip and another discrete device.

According to a fifth aspect, a computer-readable storage medium is provided, where the computer-readable storage medium stores program instructions. When the program instructions run on a computer or a processor, the computer or the processor may perform the method in any one of the foregoing aspects.

According to a sixth aspect, a computer program product including instructions is provided. When the instructions run on a computer or a processor, the computer or the processor may perform the method in any one of the foregoing aspects.

According to a seventh aspect, an inverter is provided, including an inverter circuit, a conversion circuit, and a direct current bus, where the conversion circuit is connected to the inverter circuit through the direct current bus. The conversion circuit is connected to a direct current source, and the inverter circuit is connected to an alternating current grid. The inverter further includes any one of the direct current bus voltage control apparatuses described above.

According to an eighth aspect, a voltage conversion device is provided, including a conversion circuit and the foregoing direct current bus voltage control apparatus, where the conversion circuit is connected to an inverter circuit by using a direct current bus. The conversion circuit is connected to a direct current source, and the inverter circuit is connected to an alternating current grid.

According to a ninth aspect, a combiner box is provided, including a conversion circuit and the foregoing direct current bus voltage control apparatus, where the conversion circuit is connected to an inverter circuit by using a direct current bus. The conversion circuit is connected to a direct current source, and the inverter circuit is connected to an alternating current grid.

According to a tenth aspect, a power system is provided, including a voltage converter, a direct current bus, an inverter circuit, and an alternating current grid, where the direct current bus is connected to a conversion circuit and the inverter circuit, and the conversion circuit is connected to a direct current source, and the inverter circuit is connected to the alternating current grid. The power system further includes the foregoing direct current bus voltage control apparatus.

According to an eleventh aspect, a power system is provided, including the inverter according to the seventh aspect. The inverter includes an inverter circuit, a conversion circuit, and a direct current bus, where the conversion circuit is connected to the inverter circuit through the direct current bus. The conversion circuit is connected to a direct current source, and the inverter circuit is connected to an alternating current grid.

For technical effects brought by any one of design manners in the second aspect to the eleventh aspect, refer to technical effects brought by different design manners in the first aspect. Details are not described herein again.

DESCRIPTION OF EMBODIMENTS

Figure 1:
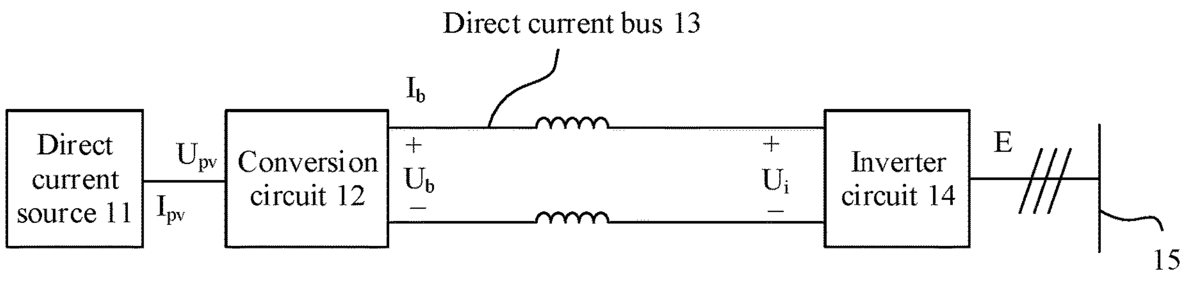
FIG. 1 is a schematic diagram of a structure of a power system according to an embodiment of this application.

The following describes technical solutions in embodiments of this application with reference to accompanying drawings in embodiments of this application. It is clear that the described embodiments are merely a part rather than all of embodiments of this application.

A steady state of a power system generally refers to a normal three-phase symmetrical operating state of the power system, and an operating parameter (for example, a voltage, a current, or power) of the power system continuously changes around an average value, and may be considered as a constant because it changes little. In actual operation of the power system, an ideal steady state rarely exists. Therefore, a steady state in engineering is considered as that the operating parameter of the power system continuously changes around a specified average value, and changes little. In engineering, a steady-state fluctuation range is represented by relative deviation. Common deviation values are 5%, 2%, 1%, and the like.

A transient state of a power system generally refers to a transition process from a steady state to another steady state, and an operating parameter of the power system in the transition process may change greatly. There are two types of transient processes. One is related to a rotating element in a power system, such as an electric generator and a motor. The transient process thereof is usually referred to as an electromechanical transient state caused by an imbalance in mechanical torque or electromagnetic torque. The other is in an original part such as a voltage regulator, a transmission line, and the like, and does not involve angular displacement, angular velocity, or the like, and its transient process is referred to as an electromagnetic transient state.

A photovoltaic module is direct current power composed of solar cells through series and parallel packaging.

A photovoltaic string is direct current power composed of a plurality of photovoltaic modules that are connected in series through positive and negative electrodes.

The terms "first" and "second" mentioned below are merely intended for a purpose of description, and shall not be understood as an indication or implication of relative importance or implicit indication of a quantity of indicated technical features. Therefore, a feature limited by "first" or "second" may explicitly indicate or implicitly include one or more such features.

In addition, in this application, directional terms such as "upper" and "lower" are defined relative to directions of components that are placed as shown in the accompanying drawings. It should be understood that these directional terms are relative concepts and are used for relative description and clarification, and may correspondingly change according to changes of directions in which components are placed in the accompanying drawings.

In this application, unless otherwise expressly specified and limited, the term "connection" may be a manner of implementing an electrical connection of signal transmission, and the term "connection" may be a direct electrical connection, or may be an indirect electrical connection by using an intermediate medium.

An embodiment of this application is applied to a power system. As shown in FIG. 1, the embodiment of this application may be applied to a power system that includes a conversion circuit 12, a direct current bus 13, and an inverter circuit 14. In some examples, the power system may further include a direct current source 11 or an alternating current grid 15, and in some examples, the power system may not include the direct current source 11 or the alternating current grid 15. The direct current source 11 is connected to the conversion circuit 12, the conversion circuit 12 is connected to the inverter circuit 14 through the direct current bus 13, and the inverter circuit 14 is connected to the alternating current grid 15. The direct current source 11 may be renewable energy generating equipment such as a wind turbine or a photovoltaic (PV) device. The photovoltaic generating equipment in this application may be a photovoltaic module or a photovoltaic string. In the following solution, the direct current source is described by using the PV device as an example. The direct current source 11 is configured to: convert natural energy such as wind energy, photovoltaic energy, and water energy into a DC-type power signal, and send the DC-type power signal (for example, a voltage of the power signal is $U_{pv}$, and a current is $I_{pv}$) to the conversion circuit 12. The conversion circuit 12 is configured to boost the received power signal, and transmit the boosted power signal (for example, a voltage of the boosted power signal is $U_b$, and a current is $I_b$) to the inverter circuit 14 through the direct current bus 13, where the conversion circuit 12 generally uses a controllable direct current to direct current (DCDC) circuit, for example, may use a boost (boost) circuit. A typical boost circuit uses a fully-controlled switching transistor, a freewheel diode and a direct current/direct current boost circuit composed of an inductor and a capacitor, and implements a voltage conversion function of the boost circuit by modulating a control signal (for example, a pulse width modulation (PWM) signal) that is used to control an on/off state of the switching transistor.

Figure 2:
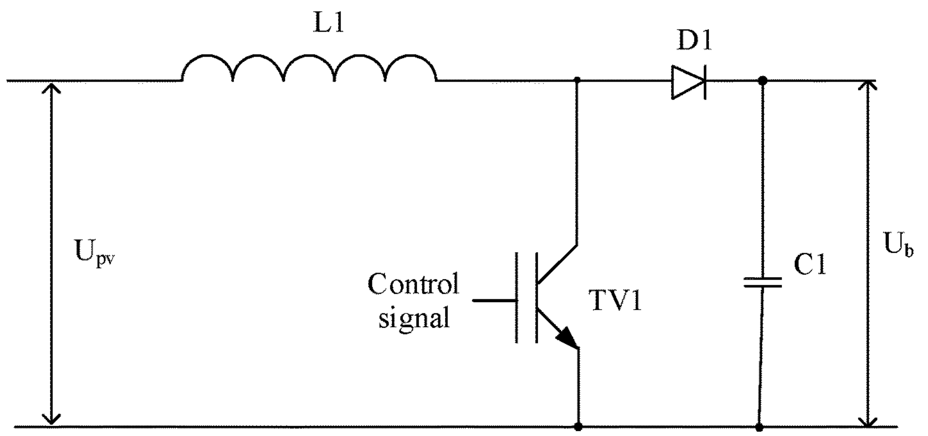
FIG. 2 is a schematic diagram of a structure of a boost circuit according to an embodiment of this application.

As shown in FIG. 2, the boost circuit includes an inductor L1, a switching transistor TV1, a diode D1, and a capacitor C1. One end of the inductor L1 is connected to a positive electrode (+) at an output end of the PV device, a second end of the inductor L1 is connected to a first end of the switching transistor TV1 (for example, may be a source (source, s)), a second end of the switching transistor TV1 (for example, may be a drain (drain, d)), a control end of the switching transistor TV1 (for example, a gate (gate, g)) inputs a control signal, and the other end of the inductor is further connected to an anode of the diode D1. A cathode of the diode D1 is connected to a first end of the capacitor C1, a second end of the capacitor C1 is connected to the second end of the switching transistor TV1, the second end of the switching transistor TV1 is connected to a negative electrode (−) at the output end of the PV device, and two ends of C1 are connected to an inverter circuit by using a direct current bus. The boost circuit can convert, under control of a control signal, a voltage $U_{pv}$ output by the PV device into $U_b$, where a duty cycle of the control signal can be used to adjust a proportional relationship between $U_{pv}$ and $U_b$. In the following description, the conversion circuit is described by using a boost circuit as an example. The inverter circuit 14 is configured to: perform direct current to alternating current (direct current to alternating current, DC-AC) conversion on a power signal received from the direct current bus 13 (because the direct current bus has an impedance (which may be expressed as inductive reactance and capacitive reactance based on a form of the direct current bus), a voltage drop is usually generated when the power signal is transmitted on the direct current bus, for example, a voltage $U_i$ of the power signal at this moment), to generate an AC-type power signal (generally, the power signal received from the direct current bus is converted into three phases, and a peak voltage of a phase voltage of each phase is $E=E_U=E_V=E_W$), and finally output the AC-type power signal to the alternating current grid 15. Certainly, an AC transformer may further be disposed between the inverter circuit 14 and the alternating current grid 15. The AC transformer is configured to boost and output the AC-type power signal output by the inverter circuit 14 to the alternating current grid 15. The inverter circuit 14 generally uses a controllable inverter circuit. A three-phase AC voltage inverter circuit is used as an example. Generally, the inverter circuit 14 may include three bridge arm circuits that are connected in parallel between direct current buses, and upper and lower bridge arms of the bridge arm circuit each include a fully-controlled switching transistor. A control signal (for example, a PWM signal) that is used to control an on/off state of the switching transistor on each bridge arm is modulated to control output of a three-phase AC voltage that is output by the inverter circuit at an intermediate connection point of the upper and lower bridge arms.

Figure 3:
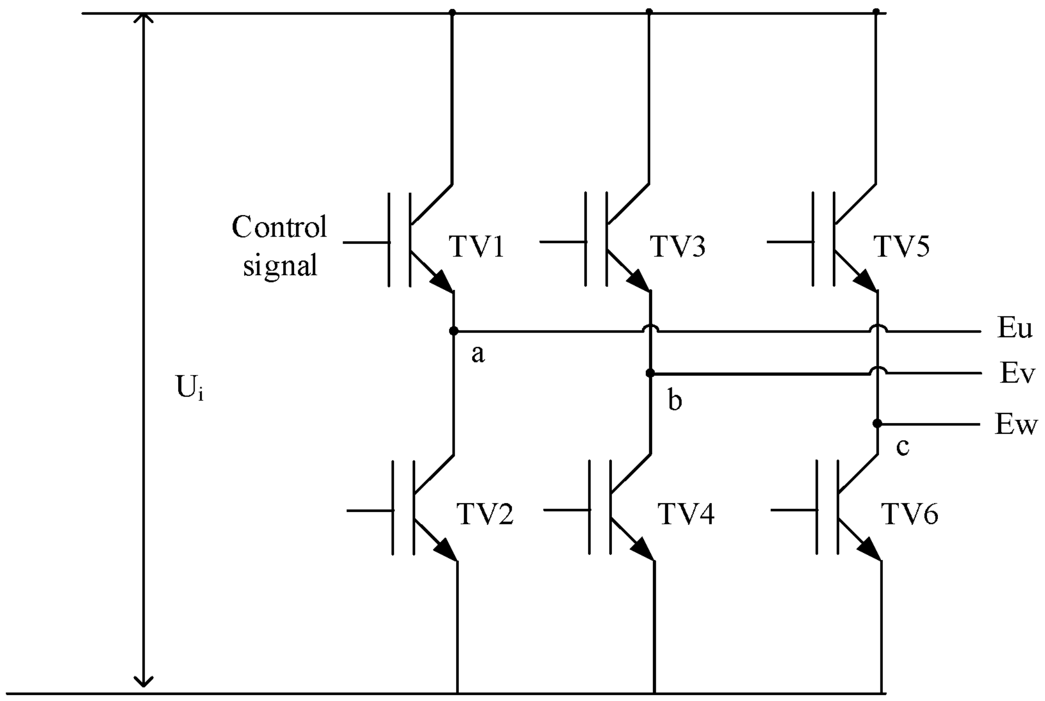
FIG. 3 is a schematic diagram of a structure of an inverter circuit according to an embodiment of this application.

As shown in FIG. 3, a three-phase AC voltage inverter circuit includes three bridge arms, where a first bridge arm composed of switching transistors TV1 and TV2 is connected in series between direct current buses, a second bridge arm composed of switching transistors TV3 and TV4 is connected in series between the direct current buses, and a second bridge arm composed of switching transistors TV5 and TV6 is connected in series between the direct current buses; and may receive a current signal from an alternating current bus (for example, a voltage is $U_i$, converted to a three-phase AC voltage, and is output to the alternating current grid at middle nodes a, b, and c of the three bridge arms) through inputting a control signal at control ends of TV1-TV6. The foregoing describes a grid connection process of the direct current source.

Figure 4:
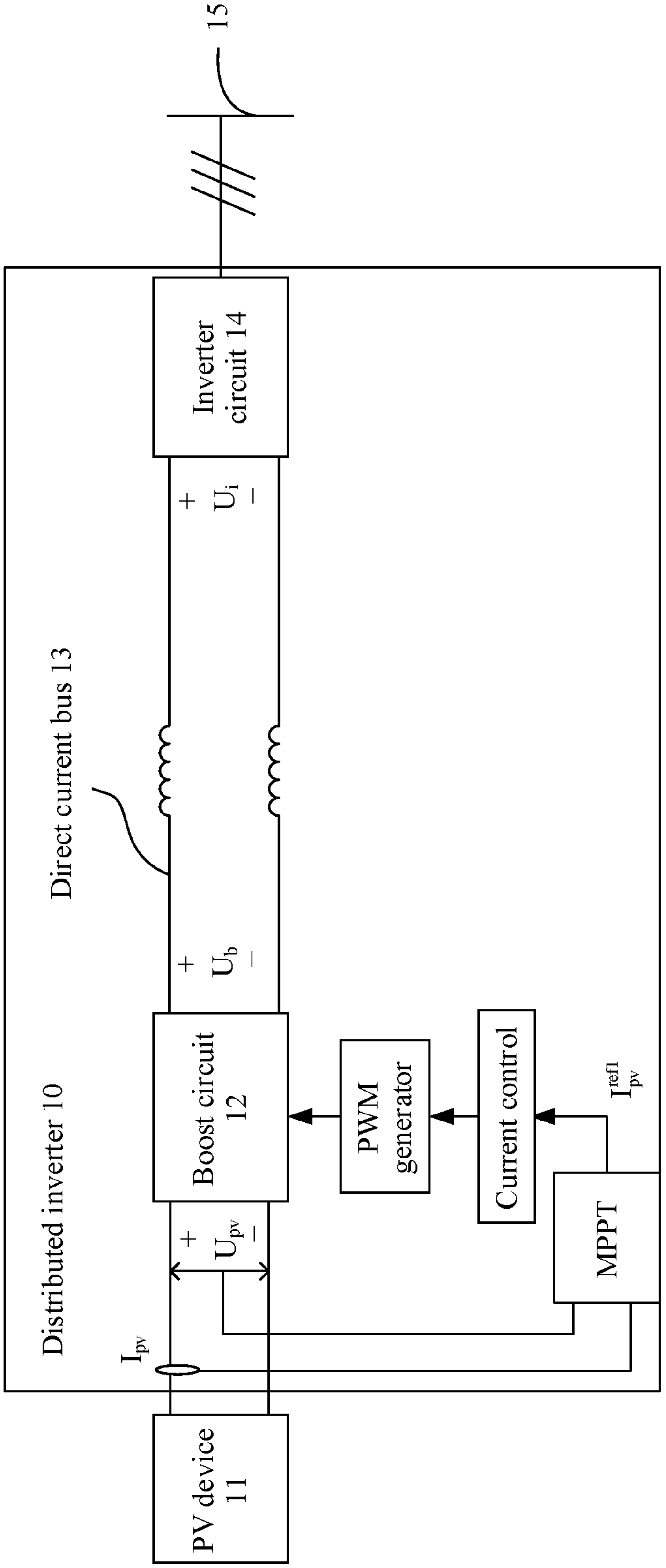
FIG. 4 is a schematic diagram of a structure of a power system according to another embodiment of this application.

With reference to FIG. 4, in some solutions, the power system provided in this embodiment of this application may be applied to a distributed inverter scenario, where a distributed inverter 10 includes: at least one boost circuit 12, a direct current bus 13, and an inverter circuit 14. For example, a direct current source uses a PV device. The boost circuit 12 is connected to a PV device 11, an input port positive electrode (+) of the boost circuit 12 is connected to a positive electrode (+) of a corresponding PV device 11, and an input port negative electrode (−) of the boost circuit 12 is connected to a negative electrode (−) of the corresponding PV device 11. An output port positive electrode (+) of the boost circuit 12 is connected to an input port positive electrode (+) on a direct current side of the inverter circuit 14 through the direct current bus 13, and an output port negative electrode (−) of the boost circuit 12 is connected to an input port negative electrode (−) on the direct current side of the inverter circuit 14 through the direct current bus 13. An AC bus of the inverter circuit 14 serves as an output port of the distributed inverter 10, and is connected to the alternating current grid 15 by using a transformer or is directly connected to the alternating current grid 15. In addition, the distributed inverter 10 may further include a control circuit integrated into the boost circuit 12 or a separately disposed boost circuit, and the control circuit of the boost circuit 12 is configured to output a control signal to the boost circuit. The distributed inverter 10 may further include a control circuit integrated into the inverter circuit 14 or a separately disposed inverter circuit, and the control circuit of the inverter circuit is configured to output a control signal to the inverter circuit. A physical distance between the boost circuit 12 and the inverter circuit 14 of the distributed inverter is generally relatively long, and may reach a maximum of one kilometer. The control circuit of the boost circuit 12 may collect, in real time, an input voltage and an input current of the boost circuit 12 and an output voltage and an output current of the boost circuit 12. The control circuit of the inverter circuit may further collect, in real time, an input voltage and an input current of the inverter circuit 14 and an output voltage and an output current of the inverter circuit 14, and provide in real time a control signal for each boost circuit 12 and a control signal for the inverter circuit 14 based on a related control policy, and exchange basic information of devices on two sides in a slow communication mode in the middle, so as to implement coordination of basic control. The boost circuit 12 and the inverter circuit 14 of the distributed inverter 10 are generally separated and disposed at a relatively long physical distance. In some examples, the boost circuit 12 may alternatively be included in a combiner box, where the combiner box includes basic functions such as current detection, grounding, and a surge protection and anti-reverse connection circuit, and further has functions such as DCDC voltage conversion (implemented by using the boost circuit 12) and temperature detection. The combiner box of the distributed inverter further includes a multichannel maximum power point tracking (maximum power point tracking, MPPT) tracking function.

Generally, the distributed inverter uses decentralized MPPT optimization, that is, a centralized grid-connected power generation mode. That is, for each PV device, an operating voltage of a maximum power point of the PV device is determined by using separate MPPT, and inversion and grid connection are collectively performed by using a unified inverter circuit. Therefore, MPPT control mainly enables, by controlling the boost circuit based on a power signal output by the PV device, the PV device to operate at a maximum power point. The MPPT in this application is not limited, for example, may be an open-loop or closed-loop MPPT method. The open-loop MPPT method mainly includes a voltage tracking method, a short-circuit current proportional coefficient method, an interpolation calculation method, and the like. The closed-loop MPPT method mainly includes a self-optimization MPPT algorithm such as a perturbation and observation method (P&O) and an incremental conductance (INC) method. For example, with reference to FIG. 4, a manner of controlling the boost circuit by using the MPPT function is briefly described below. With reference to FIG. 2, a control signal of the switching transistor TV1 in the boost circuit 12 is generally a PWM signal sent by a PWM generator, where a relationship between $U_{pv}$ and $U_b$ is mainly adjusted by controlling a duty cycle D of TV1 by using the PWM signal. Usually $$U_b = \frac{U_{pv}}{1-D},$$

the MPPT function can implement maximum power point tracking based on a voltage $U_{pv}$ of the power signal output by the PV device, for example, a voltage $U_b$ between the boost circuit and the direct current bus in a steady state is fixed. $U_{pv}$ is adjusted to $$U_{pv}^{ref}$$

based on $$U_{pv}^{ref}$$

indicated by a PV device port voltage instruction.

$$U_{pv}^{ref}$$

and $U_{pv}$ may be input to a control loop to generate a reference current $$I_{pv}^{ref1}$$

of the PV device. Then, performing current control on the PWM generator based on $$I_{pv}^{ref1}$$

and $I_{pv}$ may use loop control to adjust a PV device port voltage to $$U_{pv}^{ref}.$$

For example, a PI controller may be used to implement current control, which is specifically as follows: A duty cycle of a PWM signal generated by the PWM generator is controlled to increase or decrease based on a difference between $$I_{pv}^{ref1}$$

and $I_{pv}$, so as to implement adjustment on the duty cycle D of the TV1, thereby implementing adjustment on $U_{pv}$ and $U_b$.

In a transient process of a power grid, a direct current bus voltage on the inverter circuit side rapidly changes due to active control (for example, MPPT) or a passive response (for example, a voltage rise fault occurs in the alternating current grid). Because a length of a direct current bus line is long and a distribution parameter (for example, an inductance and a capacitance) is large, a change of a direct current voltage on the inverter circuit side cannot be instantaneously transmitted to the boost circuit side. After a voltage of the alternating current grid is detected, it is transmitted to the conversion circuit, and there is a significant delay in implementing control on the boost circuit. In this way, there is a delay in coordination on control of the boost circuit and the inverter circuit, which causes the foregoing problem. In this application, a variable electrical parameter such as a local direct current voltage and current of the boost circuit is measured in a predetermined time period, and a voltage between the inverter circuit and an alternating current bus is predicted by using a voltage prediction model established in advance based on the direct current bus (or the direct current bus and the inverter circuit). The boost circuit may be controlled in real time based on the predicted voltage to control a voltage of the direct current bus, so that a voltage between the inverter circuit and the alternating current grid can be quickly identified, so as to implement timely control on the voltage of the direct current bus, to improve stability of the power system.

Figure 5:
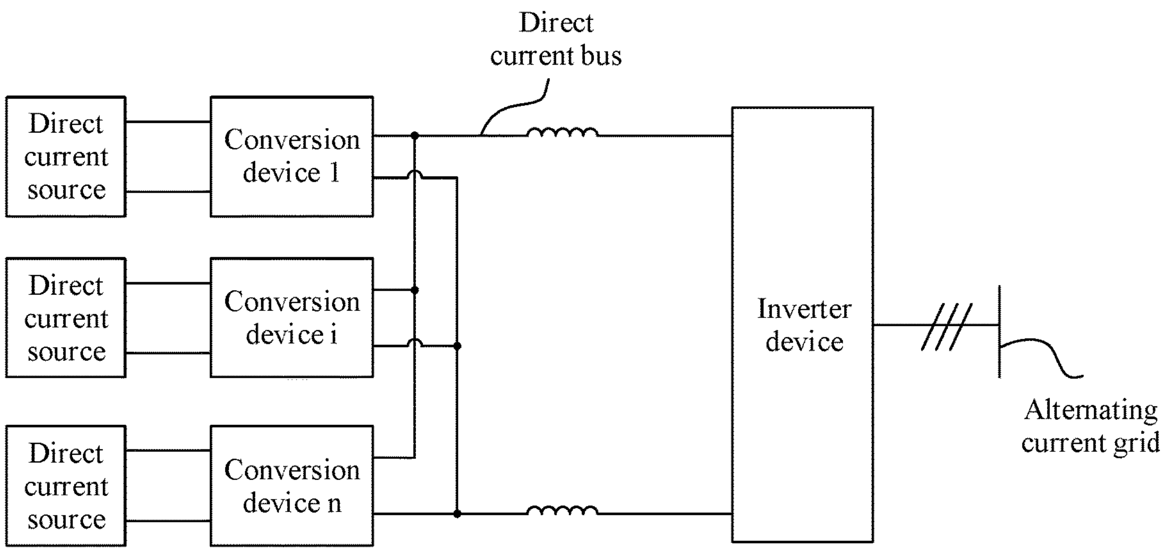
FIG. 5 is a schematic diagram of a structure of a power system according to still another embodiment of this application.

In another solution, the power system provided in this embodiment of this application may be a DC micro grid. As shown in FIG. 5, the DC micro grid includes a plurality of voltage conversion devices (1-*n*, for example, a DC/DC device, including the foregoing conversion circuit) and an inverter device (for example, a DC/AC device, including the foregoing inverter circuit). The plurality of voltage conversion devices are jointly connected to the direct current bus and are connected to a direct current port of the inverter device. The inverter device is connected to the alternating current grid by using a transformer or directly.

Figure 6:
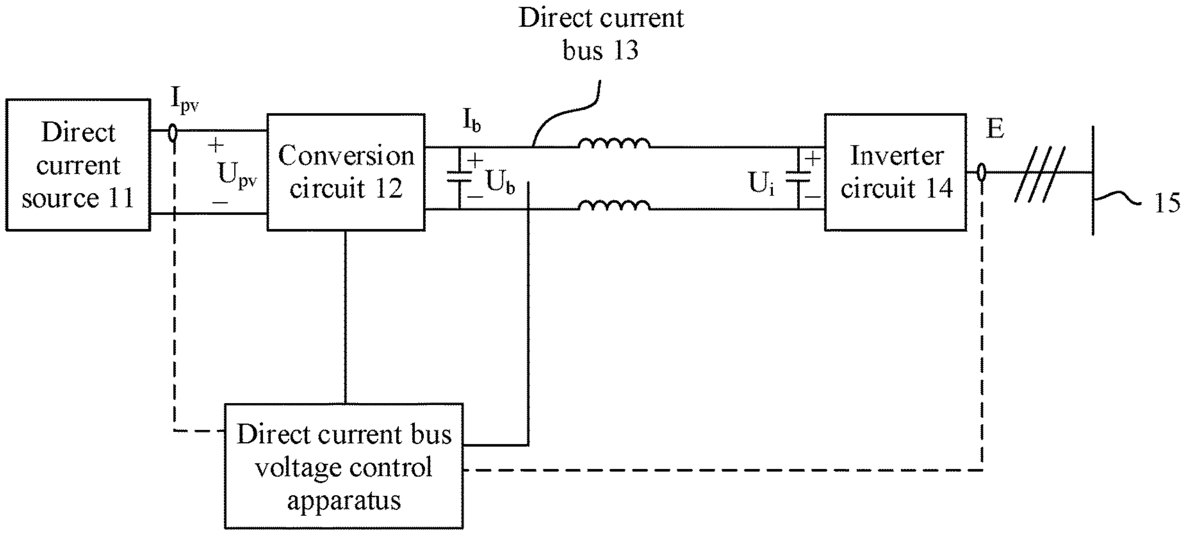
FIG. 6 is a schematic diagram of a structure of a power system according to yet another embodiment of this application.

Based on the foregoing power system, an embodiment of this application provides a direct current bus voltage control method. The power system further includes a direct current bus voltage control apparatus. As shown in FIG. 6, the following solution mainly describes voltage control on a direct current bus in a power system by the direct current bus voltage control apparatus. The direct current bus voltage control apparatus may be a separate controller or integrated into a controller of a conversion circuit.

Figure 7:
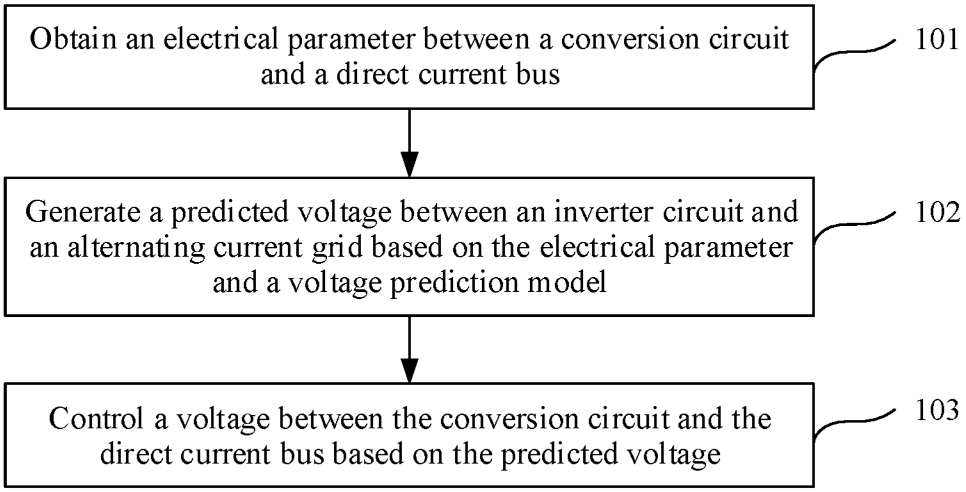
FIG. 7 is a schematic flowchart of a direct current bus voltage control method according to an embodiment of this application.

An embodiment of this application provides the foregoing direct current bus voltage control method, and the method is applied to the direct current bus voltage control apparatus in FIG. 6. Referring to FIG. 7, the method specifically includes the following steps:

101: Obtain an electrical parameter between a conversion circuit and a direct current bus.

102: Generate a predicted voltage between an inverter circuit and an alternating current grid based on the electrical parameter and a voltage prediction model.

The voltage prediction model is a model generated based on an equivalent circuit of the direct current bus, or the voltage prediction model is a model generated based on equivalent circuits of the direct current bus and the inverter circuit.

In this embodiment of this application, the electrical parameter (as shown in FIG. 6) may be one or more of electrical parameters such as a voltage $U_b$, a current $I_b$, power $P_b$, and a harmonic parameter. The power $P_b$ and the harmonic parameter may be generated by sampling and processing the voltage $U_b$ and the current $I_b$. In step 101, the electrical parameter between the conversion circuit and the direct current bus may be obtained by tracking and detecting in real time an electrical parameter on an output side of the conversion circuit 12 by using a detection device. Certainly, the electrical parameter may alternatively be a variation value of the foregoing electrical parameter within a predetermined time period, for example, a variation value $\Delta U_b$ of a voltage, and a variation value $\Delta I_b$ of a current. The variation value may be obtained by calculating a difference based on an electrical parameter at a moment t1 and an electrical parameter at a moment t2 in a predetermined time period [t1, t2], or may be a variation value directly obtained when the detection device detects that the electrical parameter changes in a predetermined time period.

Figure 8:
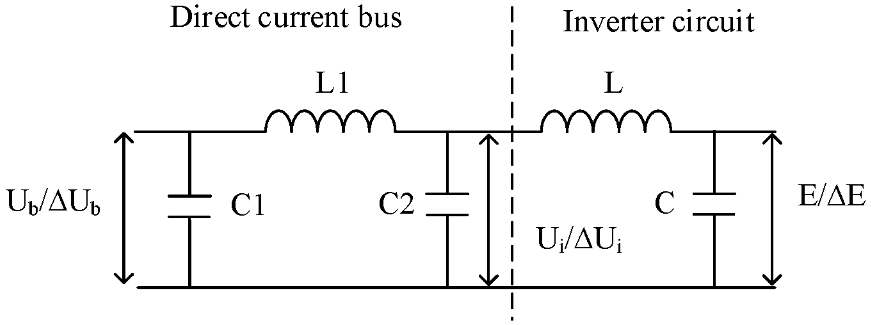
FIG. 8 is a schematic diagram of equivalent circuits of a direct current bus and an inverter circuit according to an embodiment of this application.

Based on specific forms of the direct current bus and the inverter circuit, the direct current bus and the inverter circuit each may be respectively equivalent to a circuit formed through connecting an inductor and a capacitor. For example, the direct current bus generally has a π-type topology, a T-type topology, and the like. As shown in FIG. 8, equivalent circuits of the direct current bus and the inverter circuit are provided, where the equivalent circuit of the direct current bus includes a capacitor C1, a capacitor C2, and an inductor L1. The capacitors C1 and C2, and the inductor L1 form a π-type topology, C1 is connected in parallel to an output side of a boost circuit, a first end of C1 is connected to an output port positive electrode (+) of the boost circuit, a second end of C1 is connected to an output port negative electrode (−) of the boost circuit, and a voltage is $U_b$. A first end of the inductor L1 is connected to the first end of the capacitor C1, a second end of the inductor L1 is connected to a first end of the capacitor C2, and a second end of the capacitor C2 is connected to the second end of the capacitor C2. The equivalent circuit of the inverter circuit includes an inductor L and a capacitor C. A first end of the inductor L is used as a direct current input port positive electrode (+) of the inverter circuit to be coupled to a second end of the inductor L1 (the coupling indicates that the first end of the inductor L is not directly connected to the second end of the inductor L1, for example, based on a structure of the inverter circuit, the first end of the inductor L is connected to the second end of the inductor L1 by using a switching transistor in the inverter circuit). A second end of the inductor L is connected to a first end of the capacitor C, and a second end of the capacitor C is used as a direct current input port negative electrode (−) of the inverter circuit (a voltage between the direct current input port positive electrode (+) of the inverter circuit and the direct current input port negative electrode (−) of the inverter circuit is $U_i$). The second end of the inductor L and the second end of the capacitor C are used as an alternating current output port of the inverter circuit to output a voltage E to the alternating current grid. The topology shown in FIG. 8 represents only a topology between the direct current bus and any phase output by the inverter circuit. When an inverter outputs a voltage of any phase, a switching transistor related to the phase is in an on state (equivalent to a direct short-circuit between two ends of the switching transistor), and therefore the switching transistor in the inverter circuit is not equivalent. The equivalent circuit shown in FIG. 8 is mainly used to explain a relationship among $U_b$, $U_i$, and E.

For the foregoing electrical parameter, in an example in which the electrical parameter is the voltage $U_b$ or $\Delta U_b$, generation of the voltage prediction model and generation of the predicted voltage provided in this embodiment of this application are specifically described as follows:

Example 1: The electrical parameter between the conversion circuit and the direct current bus is input into the voltage prediction model to generate the predicted voltage between the inverter circuit and the alternating current grid. With reference to FIG. 8, a relationship between the voltage $U_b$ between the conversion circuit and the direct current bus and the voltage E between the inverter circuit and the alternating current grid is mainly related to inductive reactance of an inductor and capacitive reactance of a capacitor in the equivalent circuit shown in FIG. 8. Therefore, the voltage prediction model may be obtained through training by using the voltage $U_b$ between the conversion circuit and the direct current bus as input to a learning network, and the voltage E between the inverter circuit and the alternating current grid as output of the learning network. For example, $U_b$ may be sampled at different moments, a voltage E corresponding to $U_b$ is sampled to form a mapping relationship, and then the mapping relationship is trained by using the learning network to generate the voltage prediction model. In this way, for the obtained voltage prediction model, when the voltage $U_b$ is input to the voltage prediction model, the voltage E is output.

Example 2: A second voltage variation between the inverter circuit and the alternating current grid is generated based on the electrical parameter between the conversion circuit and the direct current bus and the voltage prediction model. The predicted voltage between the alternating current grid and the inverter circuit is generated based on the second voltage variation. With reference to FIG. 8, the voltage prediction model in Example 2 is a model generated based on the equivalent circuits of the direct current bus and the inverter circuit. A relationship between the voltage $U_b$ between the conversion circuit and the direct current bus and a second voltage variation ΔE between the inverter circuit and the alternating current grid is mainly related to inductive reactance of an inductor and capacitive reactance of a capacitor in the equivalent circuit shown in FIG. 8. Therefore, the voltage prediction model may be obtained through training by using any two voltages $U_b$ as input to the learning network, and the second voltage variation ΔE between the inverter circuit and the alternating current grid as output of the learning network. When the second voltage variation ΔE corresponds to a voltage $U_{b1}$ input at a first moment t1 and a voltage $U_{b2}$ input at a second moment t2, the voltage between the inverter circuit and the alternating current grid changes. Then, the ΔE is added to a normal voltage E0 between the inverter circuit and the alternating current grid to obtain a predicted voltage E, where the normal voltage E0 may be a power grid voltage in a steady state, and the E0 may be a default value or a pre-measured value, for example, may be a voltage between the inverter circuit and the alternating current grid detected by a detection device in a steady state, and the normal voltage may be a voltage detected at any moment before a predetermined time period

[t1, t2]. In addition, the electrical parameter between the conversion circuit and the direct current bus may alternatively be a variation value $\Delta U_b$ of a voltage, for example, variation values of the voltage $U_{b1}$ input at the first moment t1 and the voltage $U_{b2}$ input at the second moment t2. In this way, the voltage prediction model may be obtained through training by using $\Delta U_b$ as input to the learning network, and the second voltage variation ΔE as output of the learning network. In the foregoing Example 2, when $U_b$ or $\Delta U_b$ is input into the corresponding voltage prediction model, the second voltage variation ΔE may be output.

Example 1 and Example 2 directly predict the voltage between the inverter circuit and the alternating current grid. Examples 3 and 4 further provide a manner of indirectly predicting a voltage between the inverter circuit and the alternating current grid.

Example 3: A voltage $U_i$ between the inverter circuit and the direct current bus is generated based on the electrical parameter between the conversion circuit and the direct current bus and the voltage prediction model; and a predicted voltage E between the alternating current grid and the inverter circuit is generated based on the voltage $U_i$.

With reference to FIG. 8, a relationship between the voltage $U_b$ between the conversion circuit and the direct current bus and the voltage $U_i$ between the direct current bus and the inverter circuit is mainly related to inductive reactance of an inductor and capacitive reactance of a capacitor of the direct current bus in the equivalent circuit shown in FIG. 8. Therefore, the voltage prediction model is a model generated based on an equivalent circuit of the direct current bus. For example, the voltage prediction model may be obtained through training by using the voltage $U_b$ as input to the learning network, and the voltage $U_i$ as output of the learning network. For example, the voltage $U_b$ may be sampled at different moments, a voltage $U_i$ corresponding to $U_b$ is sampled to form a mapping relationship, and then the mapping relationship is trained by using the learning network to generate the voltage prediction model. In this case, when the sampled $U_b$ is input to the voltage prediction model, the voltage $U_i$ can be obtained. Because an electrical characteristic of the inverter circuit is fixed, with reference to FIG. 8, a voltage ratio on two sides of the inverter circuit is mainly related to a modulation ratio of a control signal. Therefore, the voltage $U_i$ may be directly converted into a voltage E based on the modulation ratio of the inverter circuit. Generally, a modulation ratio M of the inverter circuit is defined as a peak of a phase voltage between the alternating current grid and the inverter circuit/a half of the voltage $U_i$ between the inverter circuit and the direct current bus (that is, $M=E/(U_i/2)$). This value M is generally fixed during a control process. Even in a transient state of a voltage surge fault of the alternating current grid, control logic of the inverter circuit remains unchanged, and usually a value of M is around 1.14 (maximum physical limit is 1.15).

Example 4: A first voltage variation $\Delta U_i$ between the inverter circuit and the direct current bus is generated based on the electrical parameter between the conversion circuit and the direct current bus and the voltage prediction model; the voltage prediction model is a model generated based on the equivalent circuit of the direct current bus; and a predicted voltage E between the alternating current grid and the inverter circuit is generated based on the first voltage variation $\Delta U_i$.

Specifically, a third voltage variation ΔE between the inverter circuit and the alternating current grid is generated based on the first voltage variation $\Delta U_i$ and the electrical characteristic of the inverter circuit. The predicted voltage E is generated based on the third voltage variation ΔE and a pre-stored normal voltage value E0 between the inverter circuit and the alternating current grid. With reference to FIG. 8, the voltage prediction model in the example is generated based on a model generated by the equivalent circuit of the direct current bus. A relationship between the voltage $U_b$ between the conversion circuit and the direct current bus and the first voltage variation $\Delta U_i$ between the inverter circuit and the direct current bus is mainly related to inductive reactance of an inductor and capacitive reactance of a capacitor in the equivalent circuit of the direct current bus shown in FIG. 8. Therefore, the voltage prediction model may be obtained through training by using any two voltages $U_b$ as input to the learning network, and the first voltage variation $\Delta U_i$ as output of the learning network. When the first voltage variation $\Delta U_i$ corresponds to a voltage $U_{b1}$ input at the first moment t1 and a voltage $U_{b2}$ input at the second moment t2, the voltage between the inverter circuit and the direct current bus changes. Then, the electrical characteristic of the inverter circuit is fixed, and with reference to FIG. 8, the voltage ratio on two sides of the inverter circuit is mainly related to the modulation ratio of the control signal. Therefore, the voltage $U_i$ may be directly converted into a voltage E based on the modulation ratio of the inverter circuit. Generally, the modulation ratio M of the inverter circuit is defined as a peak of a phase voltage between the alternating current grid and the inverter circuit/a half of the voltage $U_i$ between the inverter circuit and the direct current bus. This M value is generally fixed in a control process. Even in a transient state of a voltage surge fault of the alternating current grid, control logic of the inverter circuit remains unchanged, and usually a value of M is around 1.14 (maximum physical limit is 1.15). Therefore, the first voltage variation $\Delta U_i$ may be converted into the third voltage variation ΔE between the inverter circuit and the alternating current grid based on the first voltage variation $\Delta U_i$ and the electrical characteristic of the inverter circuit. The ΔE is added to a normal voltage E0 between the inverter circuit and the alternating current grid to obtain a predicted voltage E, where the normal voltage E0 may be a power grid voltage in a steady state, and E0 may be a voltage between the inverter circuit and the alternating current grid detected by a detection device in a steady state, and for example, the normal voltage may be a voltage detected at any moment before a predetermined time period. In addition, the electrical parameter between the conversion circuit and the direct current bus may alternatively be a variation value $\Delta U_b$ of a voltage, for example, variation values of the voltage $U_{b1}$ input at the first moment t1 and the voltage $U_{b2}$ input at the second moment t2. In this way, the voltage prediction model may be obtained through training by using $\Delta U_b$ between the conversion circuit and the direct current bus as input to the learning network, and the first voltage variation $\Delta U_i$ between the inverter circuit and the alternating current grid as output of the learning network. In the foregoing Example 4, when $U_b$ or $\Delta U_b$ is input into the corresponding voltage prediction model, the first voltage variation $\Delta U_i$ may be output.

103: Control a voltage between the conversion circuit and the direct current bus based on the predicted voltage.

Specifically, with reference to the foregoing description, in step 103, a control signal of a voltage converter is specifically generated based on the predicted voltage, so as to implement control on the voltage between the conversion circuit and the direct current bus.

In the foregoing solution, after obtaining the electrical parameter between the conversion circuit and the direct current bus, a direct current bus voltage control apparatus can directly generate the predicted voltage between the inverter circuit and the alternating current grid based on the electrical parameter and the voltage prediction model; then, control the voltage between the conversion circuit and the direct current bus based on the predicted voltage; and can avoid a delay caused by obtaining the voltage between the conversion circuit and the direct current bus when the inverter circuit and the conversion circuit are connected by using a long-distance direct current bus, and can quickly identify a voltage between the inverter circuit and the alternating current grid, so as to implement timely control on a voltage of the direct current bus, thereby improving stability of a power grid.

A specific implementation of step 103 is described as follows:

Embodiment 1

Figure 9:
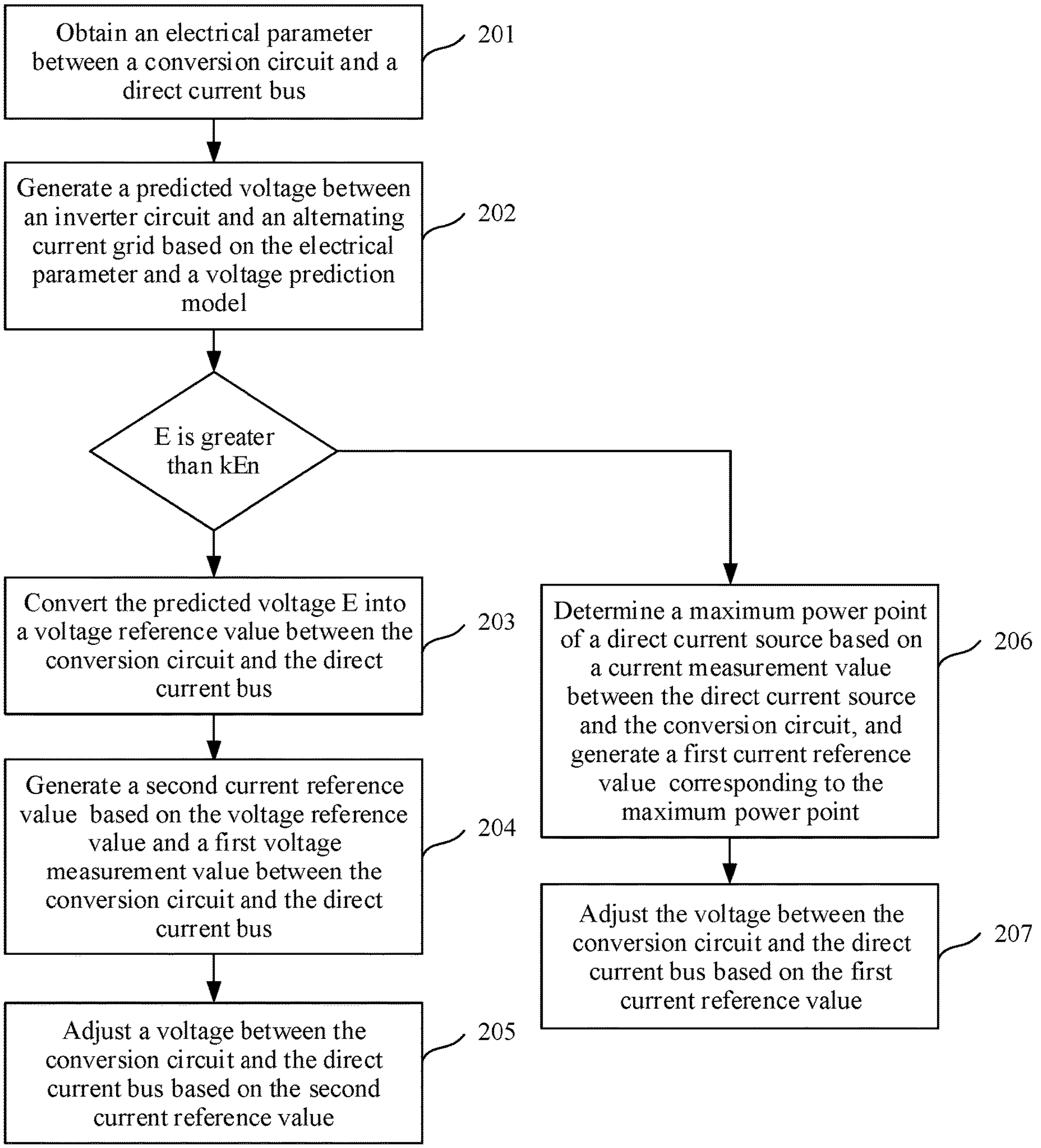
FIG. 9 is a schematic flowchart of a direct current bus voltage control method according to another embodiment of this application.
Figure 10:
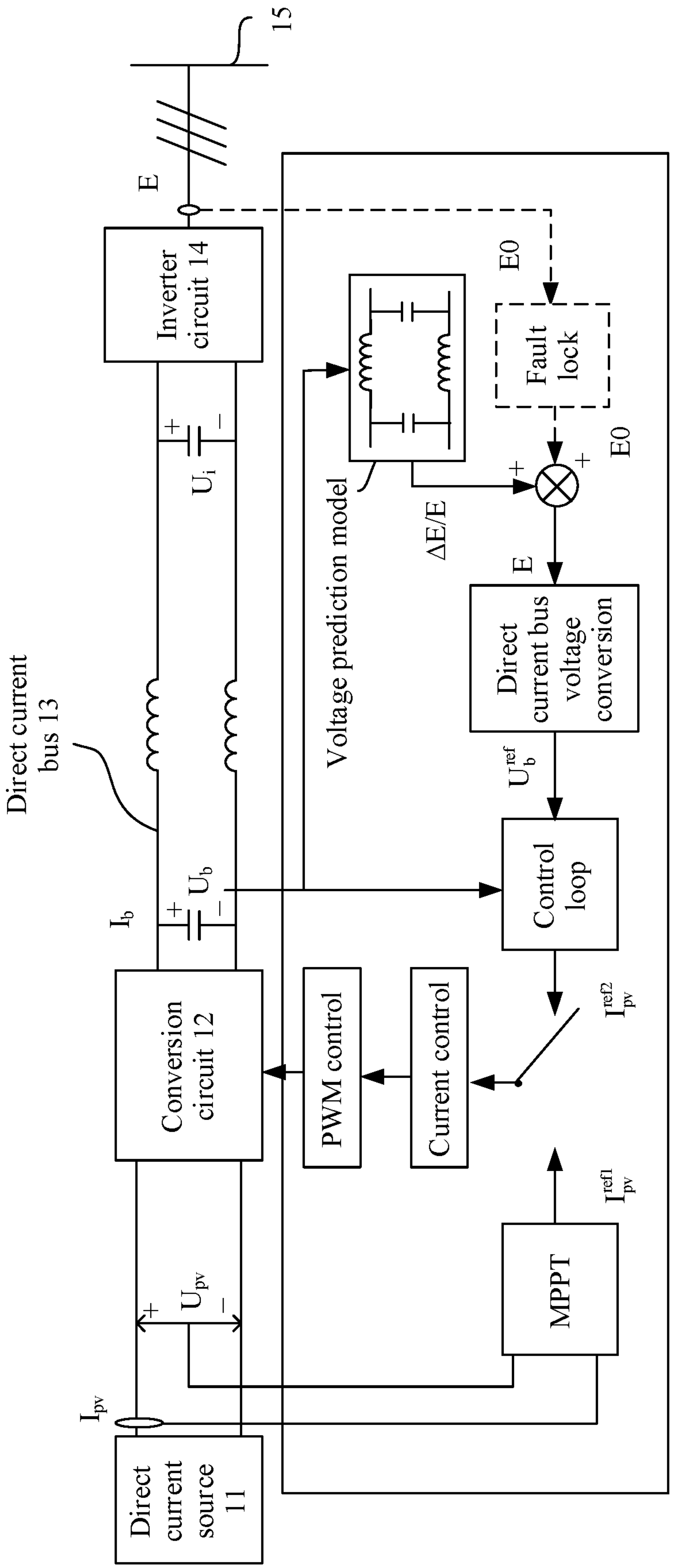
FIG. 10 is a schematic diagram of a structure of a power system according to another embodiment of this application.

An embodiment of this application provides a direct current bus voltage control method, and the method is applied to the direct current bus voltage control apparatus in FIG. 6 and, referring to FIG. 9 and FIG. 10, specifically includes the following steps:

201: Obtain an electrical parameter between a conversion circuit and a direct current bus.

202: Generate a predicted voltage between an inverter circuit and an alternating current grid based on the electrical parameter and a voltage prediction model.

For descriptions of steps 201 and 203, refer to descriptions of step 101 and step 102 directly. Details are not described herein again.

203: When it is determined that a predicted voltage E is greater than a voltage threshold kEn, convert the predicted voltage E into a voltage reference value between the conversion circuit and the direct current bus $$U_b^{ref}.$$

The voltage threshold kEn may be set based on a rated operating voltage En of the alternating current grid. For example, the voltage threshold may be set to kEn, and a value of k is determined by different power grid operators, indicating a grid-connected high voltage ride through requirement of different standards. For example, the value of k is generally set to 110% to 130%. A larger value of k indicates a higher requirement for a high voltage ride through function of a device (inverter). The inverter needs to support a case in which in a higher power grid voltage surge fault, the inverter can still be ensured not to be disconnected from the power grid, and output active power is fast and controllable. In addition, a modulation ratio M of the inverter circuit is generally fixed. In this way, a direct current voltage $U_i$ on the inverter circuit side may rise at a same ratio when the voltage E of the alternating current grid changes (a voltage between the inverter circuit and the direct current bus). To ensure that the inverter can output active power to the alternating current grid and keep controllable during a transient fault, a voltage reference value $$U_b^{ref}$$

should also be set based on the modulation ratio M in combination with the predicted voltage E, so that it can be restored to be controllable in the shortest time. For example, $$U_b^{ref} = \sqrt{\frac{2}{3}}\frac{E}{M}$$

(M is usually around 1.14), which can be adjusted up or down as required $$U_b^{ref},$$

it is ensured that a dynamic characteristic of the inverter is the best during a transient process. With reference to the foregoing Examples 1 to 4, when the predicted voltage E or the voltage $U_i$ is directly measured based on the voltage prediction model, E0 does not need to be obtained. However, when $\Delta U_i$ or $\Delta E$ is predicted based on the voltage prediction model, it is also necessary to measure E0 of the alternating current grid by using a detection device on the inverter circuit side in a steady state, and transmit it to the direct current bus voltage control apparatus through slow communication or in another manner (for example, may be a pre-stored configured default value or a pre-measured value). As shown in FIG. 10, E0 is obtained by using a detection device disposed on the alternating current grid side to detect a voltage between the alternating current grid and the inverter circuit, and is transmitted to the direct current bus voltage control apparatus in a delay communication manner. In addition, the direct current bus voltage control apparatus may perform a fault lock on E0, that is, obtains and stores the voltage E0 between the alternating current grid and the inverter circuit in a steady state. If a transient state (such as a voltage surge fault of the alternating current grid) occurs, E0 is used to predict the voltage between the alternating current grid and the inverter circuit. In an implementation process of the method provided in this embodiment of this application, E0 is used to re-receive or collect a voltage E between the alternating current grid and the inverter circuit.

204: Generate a second current reference value $$I_{pv}^{ref2}$$

based on the voltage reference value $$U_b^{ref}$$

and a first voltage measurement value $U_b$ between the conversion circuit and the direct current bus.

205: Adjust the voltage between the conversion circuit and the direct current bus based on the second current reference value $$I_{pv}^{ref2}.$$

In this solution, finally an adjustment result of a voltage of the direct current bus is to adjust the first voltage measurement value $U_b$ between the conversion circuit and the direct current bus to $$U_b^{ref}.$$

Therefore, in this solution, loop control may be performed on the voltage of the direct current bus in step 204 to generate a second current reference value $$I_{pv}^{ref2}$$

of a direct current source, and specifically, $$I_{pv}^{ref2}$$

is generated based on a difference between $$U_b^{ref}$$

and $U_b$. In step 205, after the voltage between the conversion circuit and the direct current bus is adjusted based on $$I_{pv}^{ref2},$$

the voltage between the conversion circuit and the direct current bus is $$U_b^{ref}.$$

A manner of adjusting the voltage between the conversion circuit and the direct current bus based on $$I_{pv}^{ref2}$$

is to use current control, for example, current control performed on a PWM generator based on $$I_{pv}^{ref2}$$

and $I_{pv}$ may use loop control. For example, current control may be implemented by using a PI controller, which is specifically as follows: A duty cycle of a PWM signal generated by the PWM generator increases or decreases based on $$I_{pv}^{ref2}$$

and $I_{pv}$, thereby implementing adjustment on a duty cycle D of TV1, and implementing adjustment on $U_b$.

206: When it is determined that the predicted voltage E is less than or equal to the voltage threshold kEn, determine a maximum power point of the direct current source based on a current measurement value $I_{pv}$ between the direct current source and the conversion circuit, and generate a first current reference value $$I_{pv}^{ref1}$$

corresponding to the maximum power point.

207: Adjust the voltage between the conversion circuit and the direct current bus based on the first current reference value $$I_{pv}^{ref1}.$$

MPPT control on the conversion circuit may be used in step 206 and step 207. For details, refer to the foregoing description corresponding to FIG. 4. Details are not described again.

In the foregoing Embodiment 1, step 103 in the foregoing method example is implemented by using steps 203-207. In the foregoing Embodiment 1, when the predicted voltage E is greater than the voltage threshold kEn, high voltage ride through occurs in a power system. The direct current bus voltage control apparatus directly converts the predicted voltage E into the voltage reference value $$U_b^{ref}$$

between the conversion circuit and the direct current bus, then performs loop control based on a voltage measurement value $U_b$ between the conversion circuit and the direct current bus to generate a second current reference value $$I_{pv}^{ref2},$$

and generates a control signal of the conversion circuit based on the second current reference value $$I_{pv}^{ref2}$$

to implement control, to implement voltage adjustment between the conversion circuit and the direct current bus. Because the direct current bus voltage control apparatus can obtain the predicted voltage E in real time based on the electrical parameter between the conversion circuit and the direct current bus and the voltage prediction model, a time delay of adjustment on the voltage between the conversion circuit and the direct current bus can be reduced. In particular, when a transient state such as high voltage ride through occurs in the power system, the voltage of the direct current bus can be adjusted in time, thereby improving stability of the power system.

Embodiment 2

Figure 11:
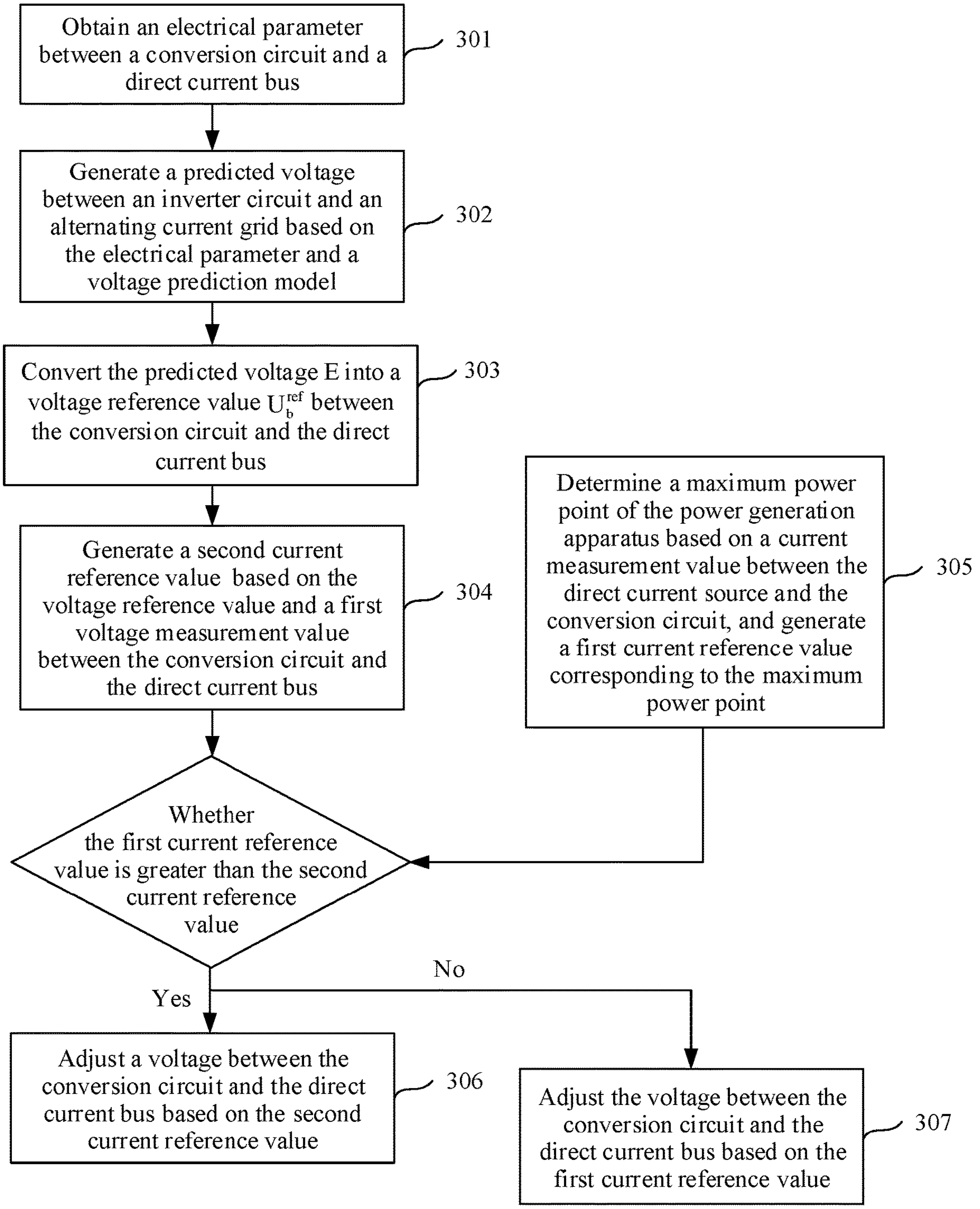
FIG. 11 is a schematic flowchart of a direct current bus voltage control method according to still another embodiment of this application.
Figure 12:
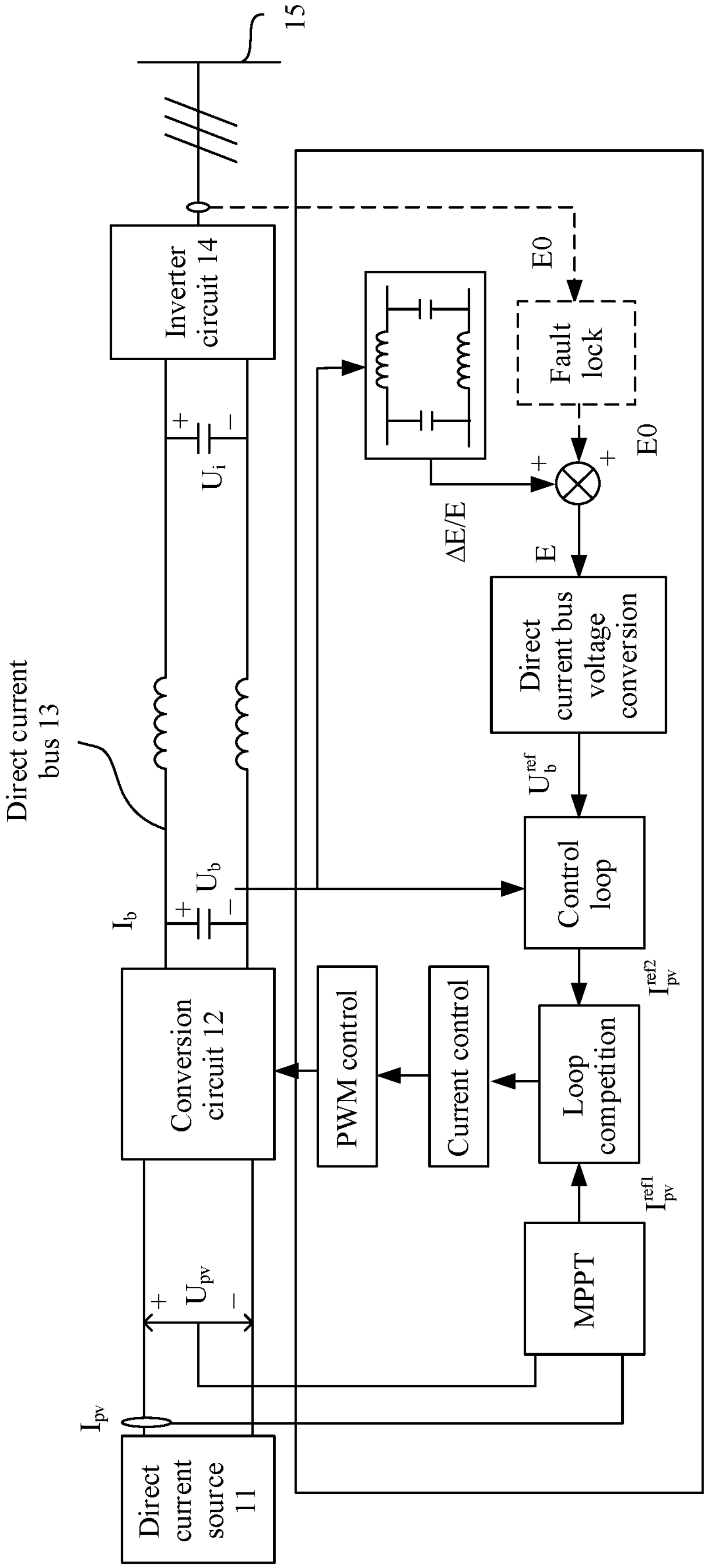
FIG. 12 is a schematic diagram of a structure of a power system according to yet another embodiment of this application.

An embodiment of this application provides a direct current bus voltage control method, and the method is applied to the direct current bus voltage control apparatus in FIG. 6, and referring to FIG. 11 and FIG. 12, specifically includes the following steps:

301: Obtain an electrical parameter between a conversion circuit and a direct current bus.

302: Generate a predicted voltage between an inverter circuit and an alternating current grid based on the electrical parameter and a voltage prediction model.

For descriptions of steps 301 and 303, refer to descriptions of step 101 and step 102 directly. Details are not described herein again.

303: Convert a predicted voltage E into a voltage reference value $$U_b^{ref}$$

between the conversion circuit and the direct current bus.

For conversion of the predicted voltage E in this step, refer to step 203. Details are not described herein again.

304: Generate a second current reference value $$I_{pv}^{ref2}$$

based on the voltage reference value $$U_b^{ref}$$

and a first voltage measurement value $U_b$ between the conversion circuit and the direct current bus.

For step 304, refer to the foregoing description of step 204. Details are not described herein again.

305: Determine a maximum power point of a direct current source based on a current measurement value $U_b$ between the direct current source and the conversion circuit, and generate a first current reference value $$I_{pv}^{ref1}$$

corresponding to the maximum power point.

306: When it is determined that the first current reference value $$I_{pv}^{ref1}$$

is greater than the second current reference value $$I_{pv}^{ref2},$$

adjust a voltage between the conversion circuit and the direct current bus based on the second current reference value $$I_{pv}^{ref2}.$$

For a manner of adjusting the voltage between the conversion circuit and the direct current bus $$I_{pv}^{ref2}$$

in step 306, refer to the description in step 205. Details are not described herein again.

307: When it is determined that the first current reference value $$I_{pv}^{ref1}$$

is less than or equal to the second current reference value $$I_{pv}^{ref2},$$

adjust the voltage between the conversion circuit and the direct current bus based on the first current reference value $$I_{pv}^{ref1}.$$

For a manner of adjusting the voltage between the conversion circuit and the direct current bus based on step $$I_{pv}^{ref1},$$

refer to the description in a step corresponding to FIG. 4. Details are not described again.

In the foregoing Embodiment 2, step 103 in the foregoing method example is implemented by using steps 303-307. The direct current bus voltage control apparatus directly converts the predicted voltage E into the voltage reference value $$U_b^{ref}$$

between the conversion circuit and the direct current bus, and then performs loop control based on the voltage measurement value $U_b$ between the conversion circuit and the direct current bus, to generate the second current reference value $$I_{pv}^{ref2};$$

and in addition, performs MPPT control on the direct current source to generate the first current reference value $I_{pv}^{ref1}$ corresponding to the maximum power point, performs loop competition on a control loop of the conversion circuit by using $I_{pv}^{ref2}$ and $I_{pv}^{ref1}$, and uses a smaller current value of the two to participate in the loop control of the conversion circuit. As described above, generally, the voltage of the alternating current grid increases to a relatively high voltage when the power system is in a transient state, and $U_b^{ref}$ may correspondingly rise to a higher voltage. In this case, $I_{pv}^{ref2}$ may be a relatively small current value. To enable the conversion circuit to effectively output power, the voltage between the conversion circuit and the direct current bus needs to be adjusted to $U_b^{ref}$.

Therefore, loop competition is performed on the control loop of the conversion circuit by using $I_{pv}^{ref2}$ and $I_{pv}^{ref1}$, and the smaller current value $I_{pv}^{ref2}$ of the two is used to participate in loop control of the conversion circuit, which can ensure that the conversion circuit can effectively output power in the transient state. In addition, when the power system restores to a steady state, the voltage of the alternating current grid decreases, and $U_b^{ref}$ may also decrease. In this case, $I_{pv}^{ref2}$ may be a relatively large current value. When $I_{pv}^{ref2}$ is large enough (for example, greater than or equal to $I_{pv}^{ref1}$), control on the conversion circuit is transferred to MPPT again by using $I_{pv}^{ref2}$ and $I_{pv}^{ref1}$ to perform loop competition on the control loop of the conversion circuit. Certainly, voltage control manners of the direct current bus based on the predicted voltage E are not limited to the foregoing two manners. For example, in this solution, MPPT control may be used in step 305 to generate a reference current $I_{pv}^{ref1}$ that is used to perform loop competition on the control loop of the conversion circuit in steps 306 and 307. Alternatively, loop competition may be performed in another manner and design on the control loop of the conversion circuit. For example, a person skilled in the art may further directly design another manner of performing loop competition on the control loop of the conversion circuit based on a relationship between $U_b^{ref}$ indicated by a port voltage instruction of a PV device and the predicted voltage E.

In the foregoing solution, when the voltage between the conversion circuit and the direct current bus is adjusted, the predicted voltage E can be obtained in real time based on the electrical parameter between the conversion circuit and the direct current bus and the voltage prediction model. Therefore, a time delay of adjustment on the voltage between the conversion circuit and the direct current bus can be reduced, especially when a transient state such as high voltage ride through occurs in the power system, the voltage of the direct current bus can be adjusted immediately, thereby improving stability of the power system.

Figure 13:
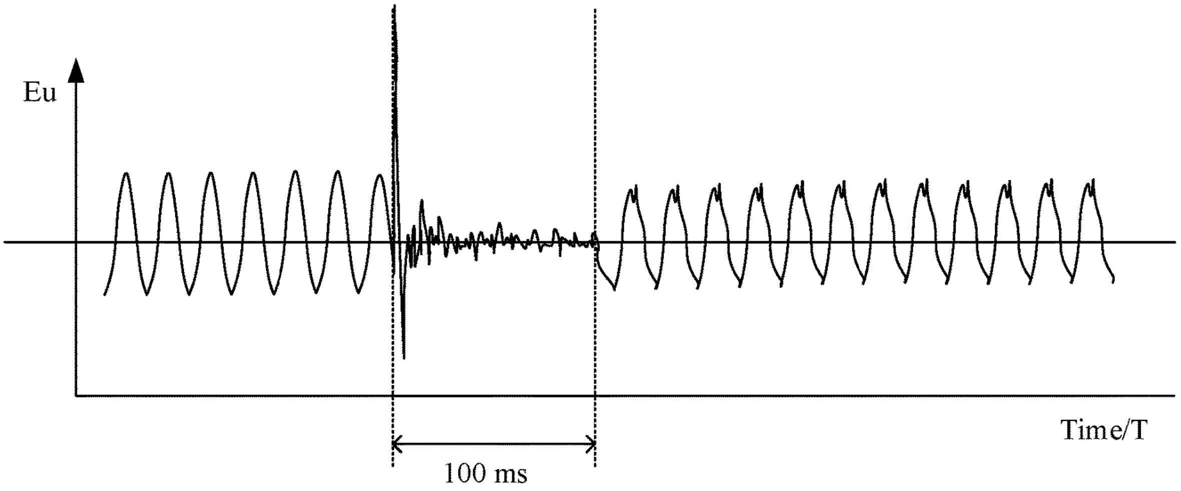
FIG. 13 is a waveform graph of a u-phase current output by an inverter circuit according to an embodiment of this application.
Figure 14:
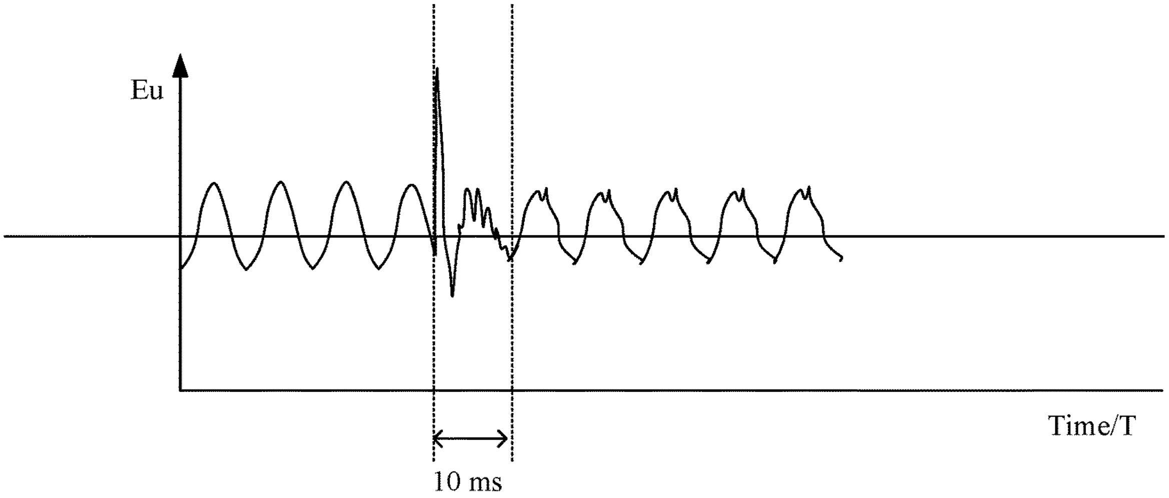
FIG. 14 is a waveform graph of a u-phase current output by an inverter circuit according to another embodiment of this application.

FIG. 13 provides, in a transient response process when the voltage of the alternating current grid suddenly increases to $1.3E_n$, after a conversion circuit in a transient process of a power system is controlled by using a manner provided in this embodiment of this application, a waveform graph of a voltage of a u-phase current output by an inverter circuit that varies with time (T). As shown in FIG. 13, after a voltage $E_u$ suddenly increases to $1.3E_n$, the u-phase current of the alternating current grid continues for 10 ms, and the voltage of the u-phase current returns to normal. FIG. 14 provides, in a transient response process when the voltage $E_u$ of the alternating current grid suddenly increases to $1.3E_n$, after the conversion circuit in a transient process of the power system is controlled in a manner in the conventional technology, a waveform graph of a voltage of a u-phase current output by an inverter circuit that varies with time (T). As shown in FIG. 14, in the conventional technology, when the voltage of the u-phase current of the alternating current grid suddenly increases to $1.3U_n$, due to a communication delay, after the fault occurs, output of active power of the inverter circuit is restored after 100 ms, and an increasingly strict fault ride through standard cannot be met.

It may be understood that the direct current bus voltage control method provided in the foregoing embodiments may be implemented by a direct current bus voltage control apparatus. The foregoing methods and/or steps may also be implemented by a component (such as a chip or a circuit) that can be used in the direct current bus voltage control apparatus.

It may be understood that, to implement the foregoing functions, the direct current bus voltage control apparatus includes corresponding hardware structures and/or software modules for performing functions. A person skilled in the art should be easily aware that units, algorithms, and steps in the examples described with reference to embodiments disclosed in this specification can be implemented in a form of hardware or a combination of hardware and computer software in this application. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In embodiments of this application, the direct current bus voltage control apparatus may be divided into functional modules based on the foregoing method embodiments. For example, functional modules corresponding to each function may be divided, or two or more functions may be integrated into one processing module. The integrated module may be implemented in a form of hardware, or may be implemented in a form of a software functional module. It should be noted that, in embodiments of this application, division into the modules is an example and is merely logical function division, and may be other division in an actual implementation.

Figure 15:
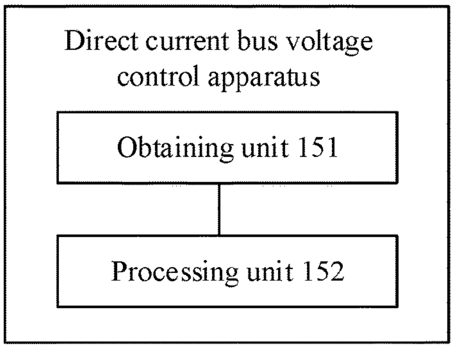
FIG. 15 is a schematic diagram of a structure of a direct current bus voltage control apparatus according to an embodiment of this application.

FIG. 15 shows a direct current bus voltage control apparatus, applied to a power system, where the power system includes a conversion circuit, a direct current bus, and an inverter circuit, and the direct current bus is connected to the conversion circuit and the inverter circuit. The conversion circuit is connected to a direct current source, and the inverter circuit is connected to an alternating current grid. The direct current bus voltage control apparatus includes:

an obtaining unit 151, configured to obtain an electrical parameter between the conversion circuit and the direct current bus; and a processing unit 152, configured to generate a predicted voltage between the inverter circuit and the alternating current grid based on the electrical parameter obtained by the obtaining unit and a voltage prediction model, where the voltage prediction model is a model generated based on an equivalent circuit of the direct current bus, or the voltage prediction model is a model generated based on equivalent circuits of the direct current bus and the inverter circuit; and control a voltage between the conversion circuit and the direct current bus based on the predicted voltage.

Optionally, the processing unit 152 is specifically configured to: generate a first voltage variation between the inverter circuit and the direct current bus based on the electrical parameter and the voltage prediction model, where the voltage prediction model is a model generated based on an equivalent circuit of the direct current bus; and generate a predicted voltage between the alternating current grid and the inverter circuit based on the first voltage variation.

Optionally, the processing unit 152 is specifically configured to: generate a third voltage variation between the inverter circuit and the alternating current grid based on the first voltage variation and an electrical characteristic of the inverter circuit; and generate the predicted voltage based on the third voltage variation and a pre-stored normal voltage value between the inverter circuit and the alternating current grid.

Optionally, the processing unit 152 is specifically configured to: generate a second voltage variation between the inverter circuit and the alternating current grid based on the electrical parameter and the voltage prediction model, where the voltage prediction model is a model generated based on equivalent circuits of the direct current bus and the inverter circuit; and generate a predicted voltage between the alternating current grid and the inverter circuit based on the second voltage variation.

Optionally, the processing unit 152 is specifically configured to: when it is determined that the predicted voltage is greater than a voltage threshold, convert the predicted voltage into a voltage reference value between the conversion circuit and the direct current bus; generate a second current reference value based on the voltage reference value and a first voltage measurement value between the conversion circuit and the direct current bus; and adjust a voltage between the conversion circuit and the direct current bus based on the second current reference value.

Optionally, the processing unit 152 is specifically configured to: convert the predicted voltage into a voltage reference value between the conversion circuit and the direct current bus based on the direct current bus and the electrical characteristic of the inverter circuit.

Optionally, the processing unit 152 is specifically configured to: when it is determined that the predicted voltage is less than or equal to the voltage threshold, determine a maximum power point of the direct current source based on a current measurement value between the direct current source and the conversion circuit, and generate a first current reference value corresponding to the maximum power point; and adjust the voltage between the conversion circuit and the direct current bus based on the first current reference value.

Optionally, the processing unit 152 is specifically configured to: convert the predicted voltage into a voltage reference value between the conversion circuit and the direct current bus; generate a second current reference value based on the voltage reference value and a first voltage measurement value between the conversion circuit and the direct current bus; and determine a maximum power point of the direct current source based on a current measurement value between the direct current source and the conversion circuit, and generate a first current reference value corresponding to the maximum power point; and when it is determined that the first current reference value is greater than the second current reference value, adjust the voltage between the conversion circuit and the direct current bus based on the second current reference value; or when it is determined that the first current reference value is less than or equal to the second current reference value, adjust the voltage between the conversion circuit and the direct current bus based on the first current reference value.

Optionally, the processing unit 152 is further configured to: based on equivalent circuits of the direct current bus and the inverter circuit, generate the voltage prediction model through training by using the electrical parameter between the conversion circuit and the direct current bus as an input parameter of a learning network, and a voltage between the inverter circuit and the alternating current grid as an output parameter of the learning network.

Optionally, the processing unit 152 is further configured to: based on an equivalent circuit of the direct current bus, generate the voltage prediction model through training by using the electrical parameter between the conversion circuit and the direct current bus as an input parameter of a learning network, and a voltage variation between the inverter circuit and the direct current bus as an output parameter of the learning network.

Optionally, the processing unit 152 is further configured to: based on equivalent circuits of the direct current bus and the inverter circuit, generate the voltage prediction model through training by using the electrical parameter between the conversion circuit and the direct current bus as an input parameter of a learning network, and a voltage variation between the inverter circuit and the alternating current grid as an output parameter of the learning network.

All related content of the steps in the method embodiments may be cited in function descriptions of corresponding functional modules. Details are not described herein again.

In this embodiment, the direct current bus voltage control apparatus is presented in a form of dividing each functional module in an integrated manner. The "module" herein may be a specific ASIC, a circuit, a processor and a memory that execute one or more software or firmware programs, an integrated logic circuit, and/or another component that can provide the foregoing functions.

For example, a direct current bus voltage control apparatus is provided, which is applied to a power system, where the power system includes a conversion circuit, a direct current bus, and an inverter circuit, and the direct current bus is connected to the conversion circuit and the inverter circuit. The conversion circuit is connected to a direct current source, and the inverter circuit is connected to an alternating current grid. The direct current bus voltage control apparatus includes a processor and a transmission interface. The processor is configured to invoke program instructions stored in a memory to perform the foregoing method. Specifically, a function/implementation process of the processing unit 152 in FIG. 15 may be implemented by the processor in the direct current bus voltage control apparatus by invoking computer execution instructions stored in the memory. A function/implementation process of the obtaining unit 151 in FIG. 15 may be implemented by using the transmission interface in the direct current bus voltage control apparatus. The direct current bus voltage control apparatus provided in this embodiment can perform the foregoing method. Therefore, for a technical effect that can be obtained by the direct current bus voltage control apparatus, refer to the foregoing method embodiment. Details are not described herein again.

Optionally, an embodiment of this application further provides a direct current bus voltage control apparatus (for example, a quality factor detection apparatus based on an oscillation circuit may be a chip or a chip system). The direct current bus voltage control apparatus includes a processor, configured to implement the method in any one of the foregoing method embodiments. In a possible design, the direct current bus voltage control apparatus further includes a memory. The memory is configured to store necessary program instructions and data. The processor may invoke program code stored in the memory to indicate the direct current bus voltage control apparatus to perform the method in any one of the foregoing method embodiments. Certainly, the memory may not be in the direct current bus voltage control apparatus. When the direct current bus voltage control apparatus is a chip system, the direct current bus voltage control apparatus may be composed of chips, or may include a chip and another discrete device. This is not specifically limited in this embodiment of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedures or functions according to embodiments of this application are at least partially generated. The computer may be a general-purpose computer, a dedicated computer, a computer network, or another programmable apparatus. The computer instruction may be stored in a computer-readable storage medium, or transmitted from one computer-readable storage medium to another computer-readable storage medium. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like. In this embodiment of this application, the computer may include the foregoing apparatus.

Although this application is described with reference to embodiments, in a process of implementing this application that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a case of multiple. A single processor or another unit may implement several functions enumerated in the claims. Some measures are set forth in dependent claims that are different from each other, but this does not mean that these measures cannot be combined to produce great effect.

Although this application is described with reference to specific features and all the embodiments thereof, it is clear that various modifications and combinations may be made to them without departing from the spirit and scope of this application. Correspondingly, this specification and the accompanying drawings are merely example description of this application defined by the appended claims, and are considered as any or all of modifications, variations, combinations or equivalents that cover the scope of this application. It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A direct current bus voltage control method, applied to a power system, wherein the method comprises:

obtaining an electrical parameter between a conversion circuit and a direct current bus comprised in the power system, wherein the conversion circuit is connected to a direct current source;

generating a predicted voltage between an inverter circuit and an alternating current grid comprised in the power system based on the electrical parameter and a voltage prediction model, wherein the direct current bus is connected to the conversion circuit and the inverter circuit, the inverter circuit is connected to the alternating current grid, and wherein the voltage prediction model is generated based on an equivalent circuit of the direct current bus or the equivalent circuits of the direct current bus and the inverter circuit; and controlling a voltage between the conversion circuit and the direct current bus based on the predicted voltage.

2. The method according to claim 1, wherein the generating the predicted voltage between the inverter circuit and the alternating current grid based on the electrical parameter and the voltage prediction model comprises:

generating a first voltage variation between the inverter circuit and the direct current bus based on the electrical parameter and the voltage prediction model, wherein the voltage prediction model is generated based on the equivalent circuit of the direct current bus; and generating the predicted voltage between the alternating current grid and the inverter circuit based on the first voltage variation.

3. The method according to claim 2, wherein the generating the predicted voltage between the alternating current grid and the inverter circuit based on the first voltage variation comprises:

generating a third voltage variation between the inverter circuit and the alternating current grid based on the first voltage variation and an electrical characteristic of the inverter circuit; and generating the predicted voltage based on the third voltage variation and a pre-stored normal voltage value between the inverter circuit and the alternating current grid.

4. The method according to claim 1, wherein the generating the predicted voltage between the inverter circuit and the alternating current grid based on the electrical parameter and the voltage prediction model comprises:

generating a second voltage variation between the inverter circuit and the alternating current grid based on the electrical parameter and the voltage prediction model, wherein the voltage prediction model is generated based on the equivalent circuits of the direct current bus and the inverter circuit; and generating the predicted voltage between the alternating current grid and the inverter circuit based on the second voltage variation.

5. The method according to claim 1, wherein the controlling the voltage between the conversion circuit and the direct current bus based on the predicted voltage comprises:

in response to determining that the predicted voltage is greater than a voltage threshold, converting the predicted voltage into a voltage reference value between the conversion circuit and the direct current bus;

generating a second current reference value based on the voltage reference value and a first voltage measurement value between the conversion circuit and the direct current bus; and adjusting the voltage between the conversion circuit and the direct current bus based on the second current reference value.

6. The method according to claim 1, wherein the controlling the voltage between the conversion circuit and the direct current bus based on the predicted voltage comprises:

in response to determining that the predicted voltage is less than or equal to a voltage threshold, determining a maximum power point of the direct current source based on a current measurement value between the direct current source and the conversion circuit, and generating a first current reference value corresponding to the maximum power point; and adjusting the voltage between the conversion circuit and the direct current bus based on the first current reference value.

7. The method according to claim 1, wherein the controlling the voltage between the conversion circuit and the direct current bus based on the predicted voltage comprises:

converting the predicted voltage into a voltage reference value between the conversion circuit and the direct current bus;

generating a second current reference value based on the voltage reference value and a first voltage measurement value between the conversion circuit and the direct current bus;

determining a maximum power point of the direct current source based on a current measurement value between the direct current source and the conversion circuit;

generating a first current reference value corresponding to the maximum power point; and in response to determining that the first current reference value is greater than the second current reference value, adjusting the voltage between the conversion circuit and the direct current bus based on the second current reference value; or in response to determining that the first current reference value is less than or equal to the second current reference value, adjusting the voltage between the conversion circuit and the direct current bus based on the first current reference value.

8. The method according to claim 1, wherein before the generating the predicted voltage between the inverter circuit and the alternating current grid based on the electrical parameter and the voltage prediction model, the method further comprises:

generating, based on the equivalent circuits of the direct current bus and the inverter circuit, the voltage prediction model through training by using the electrical parameter between the conversion circuit and the direct current bus as an input parameter of a learning network, and a voltage between the inverter circuit and the alternating current grid as an output parameter of the learning network.

9. The method according to claim 1, wherein the electrical parameter comprises one or more of a voltage, a current, or power.

10. A direct current bus voltage control apparatus, used in a power system, wherein the power system comprises a conversion circuit, a direct current bus, and an inverter circuit, wherein the direct current bus is connected to the conversion circuit and the inverter circuit, the conversion circuit is connected to a direct current source, and the inverter circuit is connected to an alternating current grid, and wherein the direct current bus voltage control apparatus comprises:

an obtaining unit, configured to obtain an electrical parameter between the conversion circuit and the direct current bus;

a processing unit, configured to: generate a predicted voltage between the inverter circuit and the alternating current grid based on the electrical parameter obtained by the obtaining unit and a voltage prediction model, wherein the voltage prediction model is generated based on an equivalent circuit of the direct current bus or the equivalent circuits of the direct current bus and the inverter circuit; and control a voltage between the conversion circuit and the direct current bus based on the predicted voltage.

11. The direct current bus voltage control apparatus according to claim 10, wherein the processing unit is specifically configured to: generate a first voltage variation between the inverter circuit and the direct current bus based on the electrical parameter and the voltage prediction model, wherein the voltage prediction model is generated based on the equivalent circuit of the direct current bus; and generate the predicted voltage between the alternating current grid and the inverter circuit based on the first voltage variation.

12. The direct current bus voltage control apparatus according to claim 10, wherein the processing unit is specifically configured to: generate a second voltage variation between the inverter circuit and the alternating current grid based on the electrical parameter and the voltage prediction model, wherein the voltage prediction model is generated based on the equivalent circuits of the direct current bus and the inverter circuit; and generate the predicted voltage between the alternating current grid and the inverter circuit based on the second voltage variation.

13. The direct current bus voltage control apparatus according to claim 10, wherein the processing unit is specifically configured to: when it is determined that the predicted voltage is greater than a voltage threshold, convert the predicted voltage into a voltage reference value between the conversion circuit and the direct current bus; generate a second current reference value based on the voltage reference value and a first voltage measurement value between the conversion circuit and the direct current bus; and adjust the voltage between the conversion circuit and the direct current bus based on the second current reference value.

14. The direct current bus voltage control apparatus according to claim 10, wherein the processing unit is specifically configured to: when it is determined that the predicted voltage is less than or equal to a voltage threshold, determine a maximum power point of the direct current source based on a current measurement value between the direct current source and the conversion circuit, and generate a first current reference value corresponding to the maximum power point; and adjust the voltage between the conversion circuit and the direct current bus based on the first current reference value.

15. An inverter, comprising an inverter circuit, a conversion circuit, and a direct current bus, wherein the conversion circuit is connected to the inverter circuit through the direct current bus, the conversion circuit is connected to a direct current source, the inverter circuit is connected to an alternating current grid, and the inverter further comprises a direct current bus voltage control apparatus, wherein the direct current bus voltage control apparatus comprises:

an obtaining unit, configured to obtain an electrical parameter between the conversion circuit and the direct current bus comprised in a power system;

a processing unit, configured to generate a predicted voltage between the inverter circuit and the alternating current grid comprised in the power system based on the electrical parameter obtained by the obtaining unit and a voltage prediction model, wherein the voltage prediction model is generated based on an equivalent circuit of the direct current bus or the equivalent circuits of the direct current bus and the inverter circuit; and control a voltage between the conversion circuit and the direct current bus based on the predicted voltage.

16. A conversion device, comprising a conversion circuit and a direct current bus voltage control apparatus, wherein the conversion circuit is connected to an inverter circuit by using a direct current bus, the conversion circuit is connected to a direct current source, and the inverter circuit is connected to an alternating current grid, wherein the direct current bus voltage control apparatus comprises:

an obtaining unit, configured to obtain an electrical parameter between the conversion circuit and the direct current bus comprised in a power system;

a processing unit, configured to generate a predicted voltage between the inverter circuit and the alternating current grid comprised in the power system based on the electrical parameter obtained by the obtaining unit and a voltage prediction model, wherein the voltage prediction model is generated based on an equivalent circuit of the direct current bus or the equivalent circuits of the direct current bus and the inverter circuit; and control a voltage between the conversion circuit and the direct current bus based on the predicted voltage.

17. A combiner box, comprising a conversion circuit and a direct current bus voltage control apparatus, wherein the conversion circuit is connected to an inverter circuit by using a direct current bus, the conversion circuit is connected to a direct current source, and the inverter circuit is connected to an alternating current grid, wherein the direct current bus voltage control apparatus comprises: an obtaining unit, configured to obtain an electrical parameter between the conversion circuit and the direct current bus comprised in a power system; a processing unit, configured to generate a predicted voltage between the inverter circuit and the alternating current grid comprised in the power system based on the electrical parameter obtained by the obtaining unit and a voltage prediction model, wherein the voltage prediction model is generated based on an equivalent circuit of the direct current bus or the equivalent circuits of the direct current bus and the inverter circuit; and control a voltage between the conversion circuit and the direct current bus based on the predicted voltage.

18. A power system, comprising a voltage converter, a direct current bus, and an inverter circuit, wherein the direct current bus is connected to a conversion circuit and the inverter circuit, the conversion circuit is connected to a direct current source, and the inverter circuit is connected to an alternating current grid; and the power system further comprises a direct current bus voltage control apparatus, wherein the direct current bus voltage control apparatus comprises: an obtaining unit, configured to obtain an electrical parameter between the conversion circuit and the direct current bus comprised in the power system; a processing unit, configured to generate a predicted voltage between the inverter circuit and the alternating current grid comprised in the power system based on the electrical parameter obtained by the obtaining unit and a voltage prediction model, wherein the voltage prediction model is generated based on an equivalent circuit of the direct current bus or the equivalent circuits of the direct current bus and the inverter circuit; and control a voltage between the conversion circuit and the direct current bus based on the predicted voltage.

* * * * *